United States Patent
Kim et al.

(10) Patent No.: US 8,116,220 B2
(45) Date of Patent: *Feb. 14, 2012

(54) METHOD FOR RECEIVING COMMUNICATION SIGNALS HAVING DIFFERING SPREADING FACTORS

(75) Inventors: Younglok Kim, Seoul (KR); Jung-Lin Pan, Smithtown, NY (US); Ariela Zeira, Huntington, NY (US); Alexander Reznik, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 650 days.

This patent is subject to a terminal disclaimer.

(21) Appl. No.: 12/258,884

(22) Filed: Oct. 27, 2008

(65) Prior Publication Data

US 2009/0046692 A1 Feb. 19, 2009

Related U.S. Application Data

(63) Continuation of application No. 10/785,866, filed on Feb. 23, 2004, now Pat. No. 7,443,828, which is a continuation of application No. 10/174,121, filed on Jun. 18, 2002, now Pat. No. 6,714,527, which is a continuation-in-part of application No. 10/100,997, filed on Mar. 19, 2002, now Pat. No. 7,136,369, which is a continuation of application No. PCT/US00/02621, filed on Feb. 2, 2000.

(60) Provisional application No. 60/154,985, filed on Sep. 21, 1999.

(51) Int. Cl.
*H04J 1/16* (2006.01)
*H04L 12/56* (2006.01)

(52) U.S. Cl. .......................... 370/252; 370/335; 370/342
(58) Field of Classification Search ................. 370/342, 370/335, 252; 375/140
See application file for complete search history.

(56) References Cited

U.S. PATENT DOCUMENTS 5,151,919 A 9/1992 Dent
(Continued)

FOREIGN PATENT DOCUMENTS

EP 1 225 707 7/2002
(Continued)

OTHER PUBLICATIONS

Benvenuto, et al., "Joint Detection with Low Computational Complexity for Hybrid TD-CDMA Systems," IEEE Journal on Selected Areas in Communication, vol. 19, No. 1, pp. 245-253, Jan. 2001.

(Continued)

*Primary Examiner* — John Pezzlo
(74) *Attorney, Agent, or Firm* — Volpe and Koenig, P.C.

(57) ABSTRACT

A method for the simultaneous reception of data from multiple sources having different spreading factors. A plurality of transmission response matrices are generated and grouped together for equal spreading factors. A plurality of spreading factor group matrices are assembled. A base matrix is formed based upon the spreading factor group matrix having a lowest spreading factor. An additional spreading factor group matrix is selected for consideration. Column placement reference index for the base matrix is derived. A reference location for the base matrix is derived. A column set from the selected spreading factor group matrix is derived. The column set is inserted into the base matrix. A total transmission response matrix is assembled.

10 Claims, 14 Drawing Sheets

U.S. PATENT DOCUMENTS

| | | | |
|---|---|---|---|
| 5,204,874 | A | 4/1993 | Falconer |
| 5,799,010 | A | 8/1998 | Lomp et al. |
| 5,970,060 | A | 10/1999 | Baier et al. |
| 6,137,824 | A | 10/2000 | Liu |
| 6,307,851 | B1 | 10/2001 | Jung et al. |
| 6,307,867 | B1 | 10/2001 | Roobol et al. |
| 6,339,612 | B1 | 1/2002 | Stewart et al. |
| 6,347,234 | B1 | 2/2002 | Scherzer |
| 6,463,097 | B1 | 10/2002 | Held et al. |
| 6,714,527 | B2 | 3/2004 | Kim et al. |
| 6,724,743 | B1 | 4/2004 | Pigeonnat |
| 6,775,260 | B1 | 8/2004 | Dabak et al. |
| 7,944,220 | B2 * | 5/2011 | Lock .............................. 324/694 |
| 2001/0053178 | A1 | 12/2001 | Yano et al. |
| 2002/0003834 | A1 | 1/2002 | Yoshimura |
| 2002/0057730 | A1 | 5/2002 | Karlsson et al. |
| 2003/0043893 | A1 | 3/2003 | Jard |
| 2003/0123384 | A1 * | 7/2003 | Agee .............................. 370/208 |
| 2005/0094712 | A1 | 5/2005 | Misra et al. |
| 2008/0043875 | A1 | 2/2008 | Misra et al. |

FOREIGN PATENT DOCUMENTS

| | | |
|---|---|---|
| GB | 2 366 973 | 3/2002 |
| JP | 2001-016134 | 1/2001 |
| WO | 99/40698 | 8/1999 |
| WO | 00/30270 | 5/2000 |
| WO | 01/22610 | 3/2001 |
| WO | 01/50659 | 7/2001 |
| WO | 2007/131384 | 11/2007 |

OTHER PUBLICATIONS

Horlin, et al., "Channel Adapted CDMA for MAI/ISI-free Power Optimized Burst Transmission with Space Diversity at the Base Station," Global Telecommunications Conference, 2001, GLOBECOM '01, IEEE, pp. 1251-1255, Nov. 29, 2001.

Karimi, et al., "A Novel and Efficient Solution to Block-Based Joint-Detection Using Approximate Cholesky Factorization," IEEE International Symposium on Personal, Indoor and Mobile Radio Communications, vol. 3, pp. 1340-1345, 1998.

Klein, et al., "Zero Forcing and Minimum Mean-Square-Error Equalization for Multiuser Detection in Code-Division Multiple-Access Channels," IEEE Transactions on Vehicular Technology, US, IEEE Inc. New York, vol. 45, No. 2, pp. 276-287, May 1, 1996.

Mayer, et al., "Realtime Feasibility of Joint Detection CDMA," EPMCC, European Personal Mobile Communications Conference Together with Kommunikation, vol. 145, No. 145, pp. 245-25, 1997.

Vollmer, et al., "Comparative Study of Joint-Detection Techniques for TD-CDMA Based Mobile Radio Systems," IEEE Journal on Selected Areas in Communications, vol. 19, No. 8, pp. 1461-1475, Aug. 2001.

Mayer, et al., "Realtime Feasibility of Joint Detection CDMA," EPMCC, European Personal Mobile Communications Conference Together with Kommunikation, vol. 145, pp. 245-25, 1997.

Karimi, et al., "A Novel and Efficient Solution to Block-Based Joint-Detection Using Approximate Cholesky Factorization," IEEE International Syposium on Personal, Indoor and Mobile Radio Communications, vol. 3, pp. 1340-1345, 1998.

* cited by examiner

METHOD FOR RECEIVING COMMUNICATION SIGNALS HAVING DIFFERING SPREADING FACTORS

CROSS REFERENCE TO RELATED APPLICATION(S)

This application is a continuation of U.S. patent application Ser. No. 10/785,866, filed Feb. 23, 2004, which is a continuation of U.S. patent application Ser. No. 10/174,121, filed Jun. 18, 2002, which issued as U.S. Pat. No. 6,714,527 on Mar. 30, 2004, which is a continuation-in-part of U.S. patent application Ser. No. 10/100,997, filed Mar. 19, 2002, which issued as U.S. Pat. No. 7,136,369 on Nov. 14, 2006, which is a continuation of PCT Application No. PCT/US00/02621, filed Feb. 2, 2000, which claims priority from U.S. Provisional Application No. 60/154,985, filed Sep. 21, 1999, which are incorporated by reference as if fully set forth.

BACKGROUND

The present invention relates generally to multiple access digital communication systems. More specifically, the invention relates to a multiuser detector system and method for the simultaneous reception of data from multiple users having different spreading factors.

A multiple-access communication system allows a plurality of users to access the same communication medium to transmit or receive information. The media may comprise, for example, a network cable in a local area network or LAN, a copper wire in the classic telephone system, or an air interface for wireless communication.

A prior art multiple access communication system is shown in FIG. 1. The communication media is referred to as a communication channel. Communication techniques such as frequency division multiple access or FDMA, time division multiple access or TDMA, carrier sense multiple access or CSMA, code division multiple access or CDMA and others allow access to the same communication medium for more than one user. These techniques can be mixed together creating hybrid varieties of multiple access schemes. For example, time division duplex or TDD mode of the proposed third generation W-CDMA standard is a combination of TDMA and CDMA.

An example CDMA prior art communication system is shown in FIG. 2. CDMA is a communication technique in which data is transmitted with a broadened band (spread spectrum) by modulating the data to be transmitted with a pseudo-noise signal. The data signal to be transmitted may have a bandwidth of only a few thousand Hertz distributed over a frequency band that may be several million Hertz. The communication channel is being used simultaneously by K independent subchannels. For each subchannel, all other subchannels appear as interference.

As shown, a single subchannel of a given bandwidth is mixed with a unique spreading code which repeats a predetermined pattern generated by a wide bandwidth, pseudo-noise (PN) sequence generator. These unique user spreading codes are typically pseudo-orthogonal to one another such that the cross-correlation between the spreading codes is close to zero. A data signal is modulated with the PN sequence producing a digital spread spectrum signal. A carrier signal is then modulated with the digital spread spectrum signal and transmitted in dependence upon the transmission medium. A receiver demodulates the transmission extracting the digital spread spectrum signal. The transmitted data is reproduced after correlation with the matching PN sequence. When the spreading codes are orthogonal to one another, the received signal can be correlated with a particular user signal related to the particular spreading code such that only the desired user signal related to the particular spreading code is enhanced while the other signals for all other users are not enhanced.

Each value of the spreading code is known as a chip and has a chip rate that is the same or faster than the data rate. The ratio between the chip rate and the subchannel data rate is the spreading factor.

To extend the possible range of values of the data signal, a symbol is used to represent more than two binary values. Ternary and quaternary symbols take on three and four values respectively. The concept of a symbol allows for a greater degree of information since the bit content of each symbol dictates a unique pulse shape. Depending upon the number of symbols used, an equal number of unique pulse or wave shapes exist. The information at the source is converted into symbols which are modulated and transmitted through the subchannel for demodulation at the destination.

The spreading codes in a CDMA system are chosen to minimize interference between a desired subchannel and all other subchannels. Therefore, the standard approach to demodulating the desired subchannel has been to treat all other subchannels as interference, similar to interference that manifests itself in the communication medium. Receivers designed for this process are single-user, matched filter and RAKE receivers.

Since different subchannels do interfere with each other somewhat, another approach is to demodulate all subchannels at a receiver. The receiver can listen to all of the users transmitting at once by running a decoding algorithm for each of them in parallel. This ideology is known as multiuser detection. Multiuser detection can provide a significant performance improvement over single-user receivers.

Referring to FIG. 3, a system block diagram of a prior art CDMA receiver using a multiuser detector is shown. The receiver may include such functions as radio frequency or RF down conversion and associated filtering for radio frequency channels, analog-to-digital conversion or optical signal demodulation for a specific communication media. The output of the receiver is a processed signal, either analog or digital, containing the combined spread signals of all active subchannels. The multiuser detector performs multiuser detection and outputs a plurality of signals corresponding to each active subchannel. All or a smaller number of the total number of subchannels may be processed.

Optimal multiuser detectors are computationally intensive devices performing numerous complex mathematic operations and are therefore difficult to implement economically. To minimize expense, suboptimal multiuser detectors such as linear detectors have been developed requiring less computational complexity as a compromise approximating the performance of optimal detectors. Linear detectors include decorrelators, minimum mean square error or MMSE detectors, and zero-forcing block linear equalizers or ZF-BLEs.

A system block diagram of a prior art linear multiuser detector for synchronous or asynchronous CDMA communication is shown in FIG. 4. Data output from the communication media specific receiver (as in FIG. 3) is coupled to a subchannel estimator which estimates the impulse response of each symbol transmitted in a respective subchannel. The linear detector uses the impulse response estimates along with a subchannel's spreading code to demodulate each subchannel's data. The data is output to subchannel data processing blocks for respective users.

To effect parallel detection of K subchannel users in a physical system, linear multiuser detector methods are executed as fixed gate arrays, microprocessors, digital signal processors or DSPs and the like. Fixed logic systems allow for greater system speed while microprocessor driven systems offer programming flexibility. Either implementation that is responsible for the multiuser detection performs a sequence of mathematic operations. To describe the functions, the following variables typically define the structure and operation of a linear multiuser detector:

K=the total number of users/transmitters that are active in the system.

$N_c$=the number of chips in a data block. The number of chips is required since with varying spreading factors this number is a measure common to all users.

W=the communication channel impulse response length in chips. This is generally a predefined parameter of the system.

$Q^{(k)}$=the spreading factor of user k. The spreading factor is equal to the number of chips that are used to spread a symbol of user's data. A system knows the spreading factors in advance and does not need to estimate them from the received data.

$N_s^{(k)}$=the number of symbols sent by user k. $N_s^{(k)}=N_c/Q^{(k)}$.

$$N_s^T = \sum_{k=1}^{K} N_s^{(k)} =$$

the total number of symbols sent.

$d^{(k)}$=the data (information) sent by user k. The data is presented in the form of a vector, where a vector is an array of data indexed by a single index variable. For the purposes of vector and matrix operations which follow, all vectors are defined as column vectors. The $n^{th}$ element of $d^{(k)}$ is the $n^{th}$ symbol transmitted by the $k^{th}$ user.

$h^{(k)}$=the impulse response of the subchannel experienced by user k presented as a vector. This quantity needs to be estimated at the receiver. The receiver's estimates of the subchannel impulse responses are referred to as $h^{(k)}$. The elements of the vector $h^{(k)}$ are typically complex numbers, which model both amplitude and phase variations that can be introduced by the subchannel.

$v^{(k)}$=the spreading code of user k, presented as a vector. For the purposes of linear multiuser detection, it is useful to think of vectors containing the section of the spreading code which spreads a particular symbol. Therefore, the vector $v^{(k,n)}$ is defined as the spreading code which is used to spread the $n^{th}$ symbol sent by the $k^{th}$ user. Mathematically, it is defined as: $vi^{(k,n)}=vi^{(k)}$ for $(n-1)Q^{(k)}+1 \# i \# nQ^{(k)}$ and 0 for all other i, where i is the index of vector elements.

$r^{(k)}$=a vector which represents user k's data, spread by the spreading sequence $v^{(k)}$ and transmitted through that user's subchannel $h^{(k)}$. The vector $r^{(k)}$ represents channel observations performed during the period of time when a block of data arrives. The $i^{th}$ element of the vector $r^{(k)}$ can be defined as:

$$r_i^{(k)} = \sum_{n=1}^{N_s^{(k)}} d_n^{(k)} \sum_{j=1}^{W} h_j^{(k)} v_{i-j+1}^{(k,n)}. \quad \text{Equation 1}$$

The signal received at the receiver includes all user signals $r^{(k)}$ plus noise. Therefore, we can define the received data vector r as follows:

$$r = \sum_{k=1}^{K} r^{(k)} + n. \quad \text{Equation 2}$$

The vector n in Equation 2 represents noise introduced by the communication channel.

FIG. 5 shows a system and method of a prior art linear multiuser detector. The estimated subchannel impulse response vectors $h^{(k)}$ and the spreading codes $v^{(k)}$ are used to create a system transmission response matrix for each user k. A matrix is a block of numbers indexed by two indexing variables and is arranged as a rectangular grid, with the first indexing variable being a row index and the second indexing variable being a column index.

A system transmission response matrix for user k is typically denoted as $A^{(k)}$. The $i^{th}$-row, $n^{th}$-column element is denoted as $A_{i,n}^{(k)}$ and is defined as:

$$A_{i,n}^{(k)} = \sum_{j=1}^{W} h_j^{(k)} v_{i-j+1}^{(k,n)} \quad \text{Equation 3}$$

Each column of the matrix $A^{(k)}$ corresponds to a matched filter response for a particular symbol sent by user k during the period of interest. Referring back to FIG. 5, the received data r is matched to a combination of all user's spreading codes and subchannel impulse responses. Therefore, $A^{(k)}$ contains $N_s^{(k)}$ matched filter responses. The columns of $A^{(k)}$ are of the form $$A_n^{(k)} = \begin{bmatrix} 0 \\ \vdots \\ 0 \\ b_n^{(k)} \\ 0 \\ \vdots \\ 0 \end{bmatrix} \quad \text{Equation 4}$$

where each vector $b_n^{(k)}$ has a dimension of $Q^{(k)}+W-1$ \quad Equation 5 and is offset from the top of the matrix $A_n^{(k)}$ by $(n-1) \cdot Q^{(k)}$ \quad Equation 6

Since the spreading codes are not periodic over symbol times; $b_i^{(k)}$ $b_j^{(k)}$ for i j. The elements of a vector which may be non-zero values are referred to as the support of the vector. Therefore, $b_n^{(k)}$ is the support of $A_n^{(k)}$.

Once a system transmission matrix for each user is created, a total system transmission response matrix, denoted as A is created by concatenating the system transmission matrices for all the users as shown below:

$A=[A^{(1)}, \ldots, A^{(k)}, \ldots, A^{(K)}]$ \quad Equation 7

In accordance with prior art modulation techniques, the elements of $h^{(k)}$ can be complex numbers. It then follows that the non-zero elements of A can be complex numbers.

An example total system transmission response matrix A for a hypothetical prior art multiuser detector assembled in accordance with Equations 4, 5, 6 and 7 is $$A = \begin{bmatrix} b_{1,1}^{(1)} & 0 & 0 & 0 & 0 & 0 & 0 & 0 & b_{1,1}^{(2)} & 0 & 0 & 0 \\ b_{1,2}^{(1)} & 0 & 0 & 0 & 0 & 0 & 0 & 0 & b_{1,2}^{(2)} & 0 & 0 & 0 \\ b_{1,3}^{(1)} & b_{2,1}^{(1)} & 0 & 0 & 0 & 0 & 0 & 0 & b_{1,3}^{(2)} & 0 & 0 & 0 \\ b_{1,4}^{(1)} & b_{2,2}^{(1)} & 0 & 0 & 0 & 0 & 0 & 0 & b_{1,4}^{(2)} & 0 & 0 & 0 \\ b_{1,5}^{(1)} & b_{2,3}^{(1)} & b_{3,1}^{(1)} & 0 & 0 & 0 & 0 & 0 & b_{1,5}^{(2)} & b_{2,1}^{(2)} & 0 & 0 \\ 0 & b_{2,4}^{(1)} & b_{3,2}^{(1)} & 0 & 0 & 0 & 0 & 0 & b_{1,6}^{(2)} & b_{2,2}^{(2)} & 0 & 0 \\ 0 & b_{2,5}^{(1)} & b_{3,3}^{(1)} & b_{4,1}^{(1)} & 0 & 0 & 0 & 0 & b_{1,7}^{(2)} & b_{2,3}^{(2)} & 0 & 0 \\ 0 & 0 & b_{3,4}^{(1)} & b_{4,2}^{(1)} & 0 & 0 & 0 & 0 & 0 & b_{2,4}^{(2)} & 0 & 0 \\ 0 & 0 & b_{3,5}^{(1)} & b_{4,3}^{(1)} & b_{5,1}^{(1)} & 0 & 0 & 0 & 0 & b_{2,5}^{(2)} & b_{3,1}^{(2)} & 0 \\ 0 & 0 & 0 & b_{4,4}^{(1)} & b_{5,2}^{(1)} & 0 & 0 & 0 & 0 & b_{2,6}^{(2)} & b_{3,2}^{(2)} & 0 \\ 0 & 0 & 0 & b_{4,5}^{(1)} & b_{5,3}^{(1)} & b_{6,1}^{(1)} & 0 & 0 & 0 & b_{2,7}^{(2)} & b_{3,3}^{(2)} & 0 \\ 0 & 0 & 0 & 0 & b_{5,4}^{(1)} & b_{6,2}^{(1)} & 0 & 0 & 0 & 0 & b_{3,4}^{(2)} & 0 \\ 0 & 0 & 0 & 0 & b_{5,5}^{(1)} & b_{6,3}^{(1)} & b_{7,1}^{(1)} & 0 & 0 & 0 & b_{3,5}^{(2)} & b_{4,1}^{(2)} \\ 0 & 0 & 0 & 0 & 0 & b_{6,4}^{(1)} & b_{7,2}^{(1)} & 0 & 0 & 0 & b_{3,6}^{(2)} & b_{4,2}^{(2)} \\ 0 & 0 & 0 & 0 & 0 & b_{6,5}^{(1)} & b_{7,3}^{(1)} & b_{8,1}^{(1)} & 0 & 0 & b_{3,7}^{(2)} & b_{4,3}^{(2)} \\ 0 & 0 & 0 & 0 & 0 & 0 & b_{7,4}^{(1)} & b_{8,2}^{(1)} & 0 & 0 & 0 & b_{4,4}^{(2)} \\ 0 & 0 & 0 & 0 & 0 & 0 & b_{7,5}^{(1)} & b_{8,3}^{(1)} & 0 & 0 & 0 & b_{4,5}^{(2)} \\ 0 & 0 & 0 & 0 & 0 & 0 & 0 & b_{8,4}^{(1)} & 0 & 0 & 0 & b_{4,6}^{(2)} \\ 0 & 0 & 0 & 0 & 0 & 0 & 0 & b_{8,5}^{(1)} & 0 & 0 & 0 & b_{4,7}^{(2)} \end{bmatrix}$$

$\underbrace{\phantom{XXXXXXXXX}}_{A^{(1)}}$  $\underbrace{\phantom{XXXX}}_{A^{(2)}}$ for two (k=2) users, $A^{(1)}$ and $A^{(2)}$, having sixteen chips in a data block ($N_c$=16), a channel impulse response length of four (W=4) and a spreading factor for the first user of two ($Q^{(1)}$=2) and a spreading factor for the second user of four ($Q^{(2)}$=4). In the resultant total system transmission response matrix A, $b_{n,i}^{(k)}$ denotes the $i^{th}$ element of the combined system and channel response for the $n^{th}$ symbol of the $k^{th}$ user.

The received data r is processed using the total system transmission response matrix A which represents a bank of matched filter responses to create a vector of matched-filter outputs which is denoted as y. The matched filtering operation is defined as $$Y = A^H r \qquad \text{Equation 9}$$

The matrix $A^H$ represents the Hermitian (or complex) transpose of the matrix A. The Hermitian transpose is defined as $A_{ij}^H = \overline{A}_{ji}$ where the over-bar denotes the operation of taking a conjugate of a complex number. The matched filter outputs are then multiplied by the inverse of an objective matrix O. The objective matrix O represents the processing which differentiates each type of linear receiver model. It is derived from the system transmission matrix A.

The zero-forcing block linear equalizer (ZF-BLE) receiver is a linear receiver with an objective matrix specified as $O=A^H A$. The minimum mean square error block linear equalizer (MMSE-BLE) receiver is a linear receiver with an objective matrix specified as $O=A^H A + o^{-2} I$ where $o^{-2}$ is the variance of the noise present on each of the symbols of the received data vector r and the matrix I is known as an identity matrix. An identity matrix is square and symmetric with 1s on its main diagonal and zeros everywhere else. The size of the identity matrix is chosen so as to make the addition operation valid according to the rules of linear algebra.

For a decorrelator (decorrelating receiver), matrix A is simplified by ignoring the channel responses $h^{(k)}$, considering only the spreading codes and their cross-correlation (interference) properties. A cross-correlation matrix, commonly referred to as R, is generally constructed for decorrelator type receivers. This matrix can be constructed by assuming that W=1 and $h_t^{(k)}$=1 in the definition of A above (i.e. the channel response of every subchannel is an impulse). Then the cross correlation matrix R is the objective matrix O as defined for the ZF-BLE receiver. A decorrelator often serves as a subprocess of a more complex multiuser detection receiver. Once the objective matrix is created, the multiuser detector will invert the matrix, denoted as $O^{-1}$.

Equation 8

The inverse of the objective matrix is then multiplied by the matched filter output vector y to produce estimates of the data vector d where $d(\text{estimate})=O^{-1}y$. The inversion of the objective matrix O is a complex, computationally intensive process. The number of operations required to perform this process increase as the cube of the size of the matrix O. For most asynchronous CDMA receivers, the size of O is very large which makes the process of inversion impracticable.

To overcome this limitation, and to make the system physically realizable, a numerical method due to Cholesky is used. Cholesky decomposition can significantly reduce the computational complexity of inverting the matrix O if the matrix is banded.

A banded matrix is a square matrix that contains non-zero values only on several diagonals away from the main diagonal. The number of non-zero diagonals adjacent to the main diagonal that have at least one non-zero element is referred to as bandwidth. Thus, a symmetric matrix M is said to be banded with bandwidth p if $$m_{ij}=0 \text{ for all } j>i+p \qquad \text{Equation 10}$$

where $m_{ij}$ is an element of M, with i being the row index and j the column index. For a banded matrix with size denoted as n and bandwidth denoted as p, Cholesky decomposition can reduce the required numeric operations of inverting the objective matrix O from varying as the cube of the size of the matrix, $n^3$, to varying as the size of the matrix times the square of the bandwidth, $np^2$.

As discussed above, the objective matrix for a ZF-BLE receiver is $O=A^H A$. To illustrate the numeric complexity, the objective matrix O for the total system response matrix A shown in Equation 6 is $$O = \begin{bmatrix} x & x & x & 0 & 0 & 0 & 0 & x & x & 0 & 0 \\ x & x & x & x & 0 & 0 & 0 & x & x & 0 & 0 \\ x & x & x & x & x & 0 & 0 & x & x & x & 0 \\ 0 & x & x & x & x & x & 0 & 0 & x & x & x & 0 \\ 0 & 0 & x & x & x & x & x & 0 & 0 & x & x & x \\ 0 & 0 & 0 & x & x & x & x & x & 0 & x & x & x \\ 0 & 0 & 0 & 0 & x & x & x & x & 0 & 0 & x & x \\ 0 & 0 & 0 & 0 & 0 & x & x & x & 0 & 0 & x & x \\ x & x & x & x & 0 & 0 & 0 & 0 & x & x & 0 & 0 \\ x & x & x & x & x & x & 0 & x & x & x & x & 0 \\ 0 & 0 & x & x & x & x & x & x & 0 & x & x & x \\ 0 & 0 & 0 & 0 & x & x & x & x & 0 & 0 & x & x \end{bmatrix} \quad \text{Equation 11}$$

where zeros denote all elements that by mathematical operation yield zero and with x's representing non-zero values. If the non-zero elements of the $i^{th}$ row and $j^{th}$ column of the total system response matrix A do not have the same vector index, then the corresponding element of objective matrix O with row index i and column index j will be 0. The bandwidth of O (Equation 11) is equal to 9 since there are non-zero elements as far as nine columns away from the main diagonal.

The objective matrix O as it is constructed in the prior art receiver shown in FIG. 5 is not well banded. Therefore, Cholesky decomposition cannot be used effectively to reduce the operational complexity when inverting matrix O. However, the prior art discloses that when all users transmit with equal spreading factors, a re-arrangement of the total system transmission response matrix A can be performed prior to calculating an objective matrix O, turning matrix O into a banded matrix. A system block diagram for this process is shown in FIG. 6.

The process which computes the column re-arrangement of matrix A performs the re-arrangement without any additional information. The re-arrangement reduces the operational complexity when inverting the matrix. Once the detection procedure is complete, a user data vector d is computed, a reversed re-arrangement process is performed descrambling vector d back to its original form for further processing.

In a typical asynchronous CDMA system, the bandwidth of a re-arranged objective matrix is at least ten times less than its original size. Therefore, a savings of at least a factor of 100 in processing time is achieved when Cholesky decomposition is performed on an objective matrix based upon a re-arranged total system response matrix. However, the prior art has not addressed a re-arrangement method for when different spreading factors are in use between active users.

Accordingly, it is desirable to reduce the complexity for multiuser detection.

SUMMARY

A method for the simultaneous reception of data from multiple sources having different spreading factors. A plurality of transmission response matrices are generated and grouped together for equal spreading factors. A plurality of spreading factor group matrices are assembled. A base matrix is formed based upon the spreading factor group matrix having a lowest spreading factor. An additional spreading factor group matrix is selected for consideration. Column placement reference index for the base matrix is derived. A reference location for the base matrix is derived. A column set from the selected spreading factor group matrix is derived. The column set is inserted into the base matrix. A total transmission response matrix is assembled.

BRIEF DESCRIPTION OF THE DRAWING(S)

DETAILED DESCRIPTION OF THE PREFERRED EMBODIMENT(S)

Figure 1:
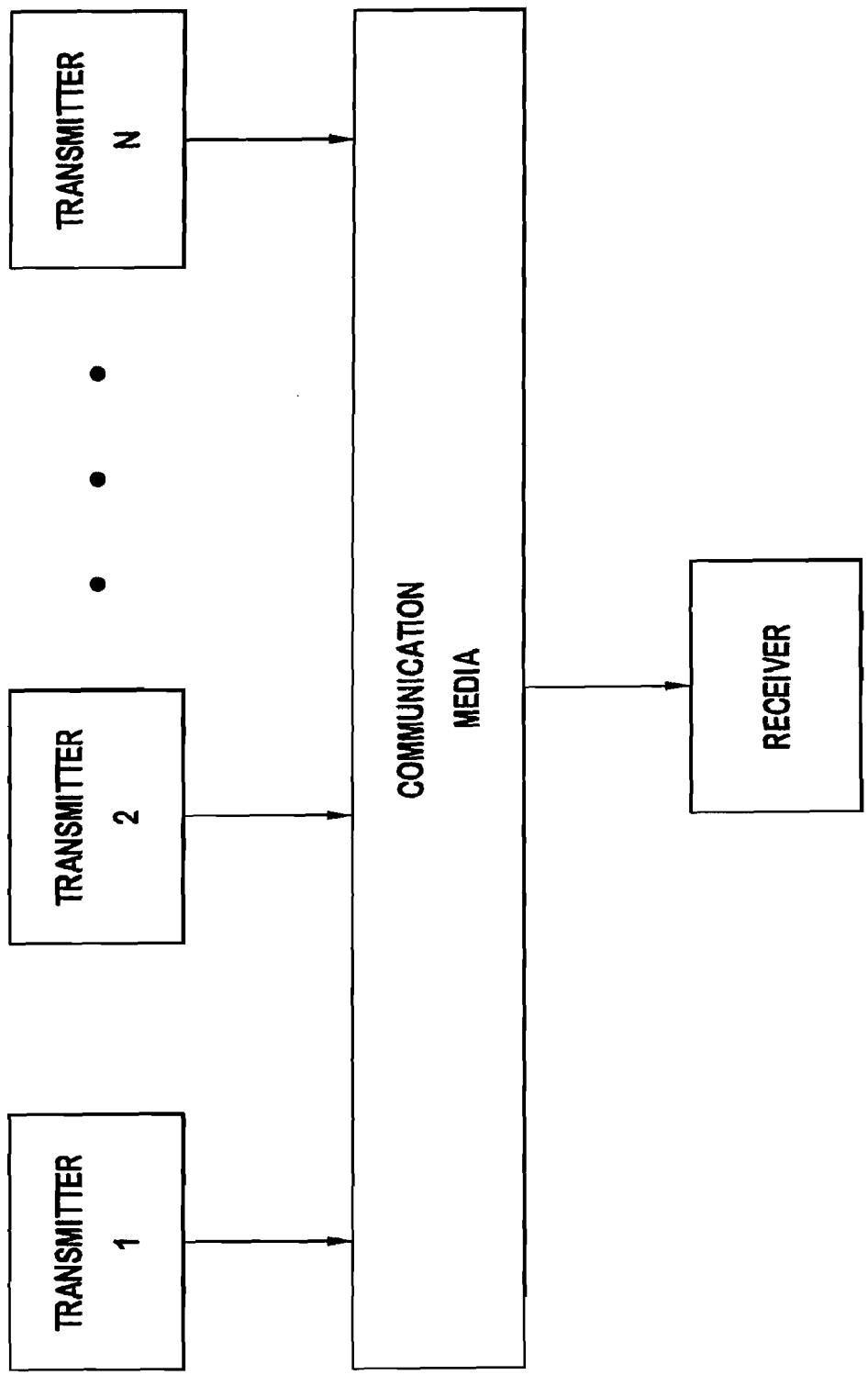
FIG. 1 is a simplified block diagram of a prior art multiple access communication system.
Figure 2:
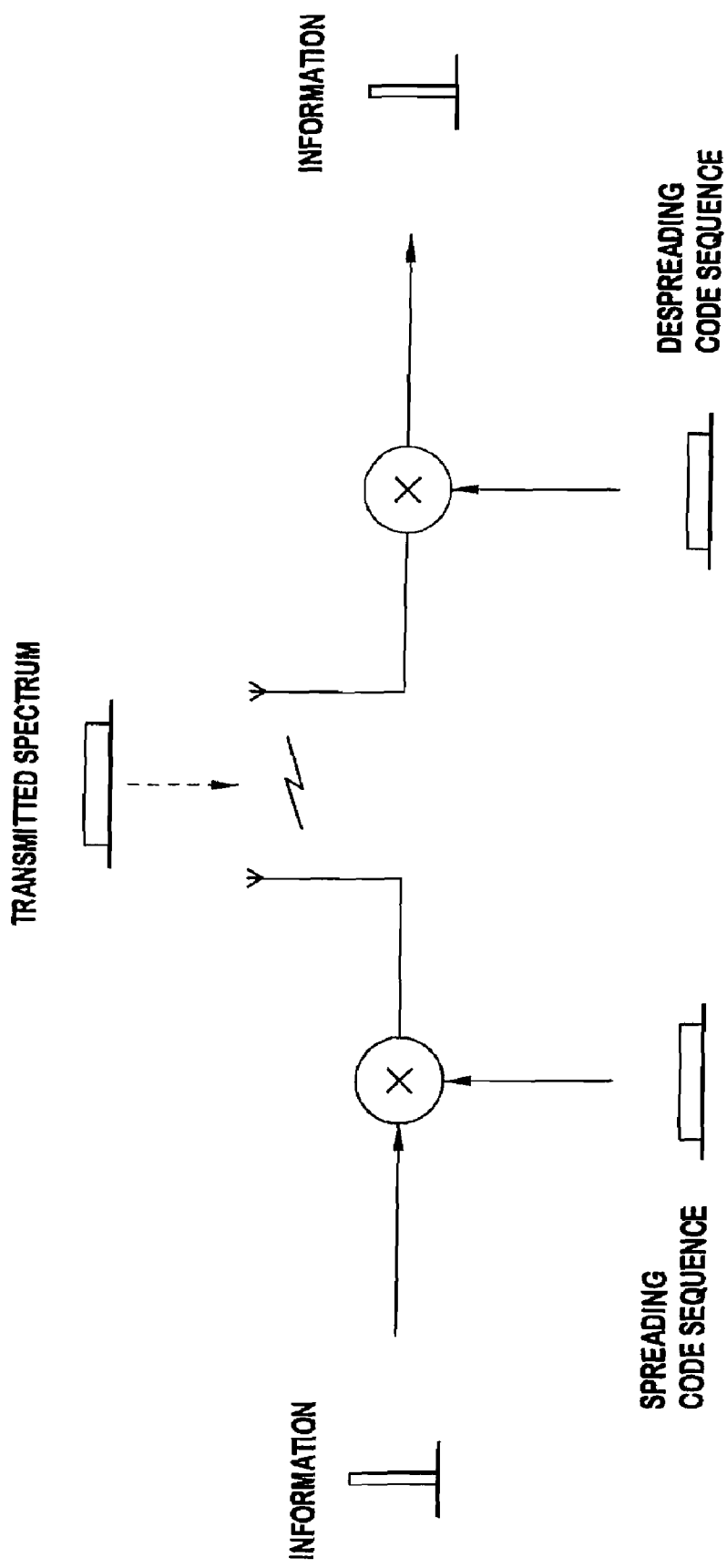
FIG. 2 is a simplified block diagram of a prior art CDMA communication system.
Figure 3:
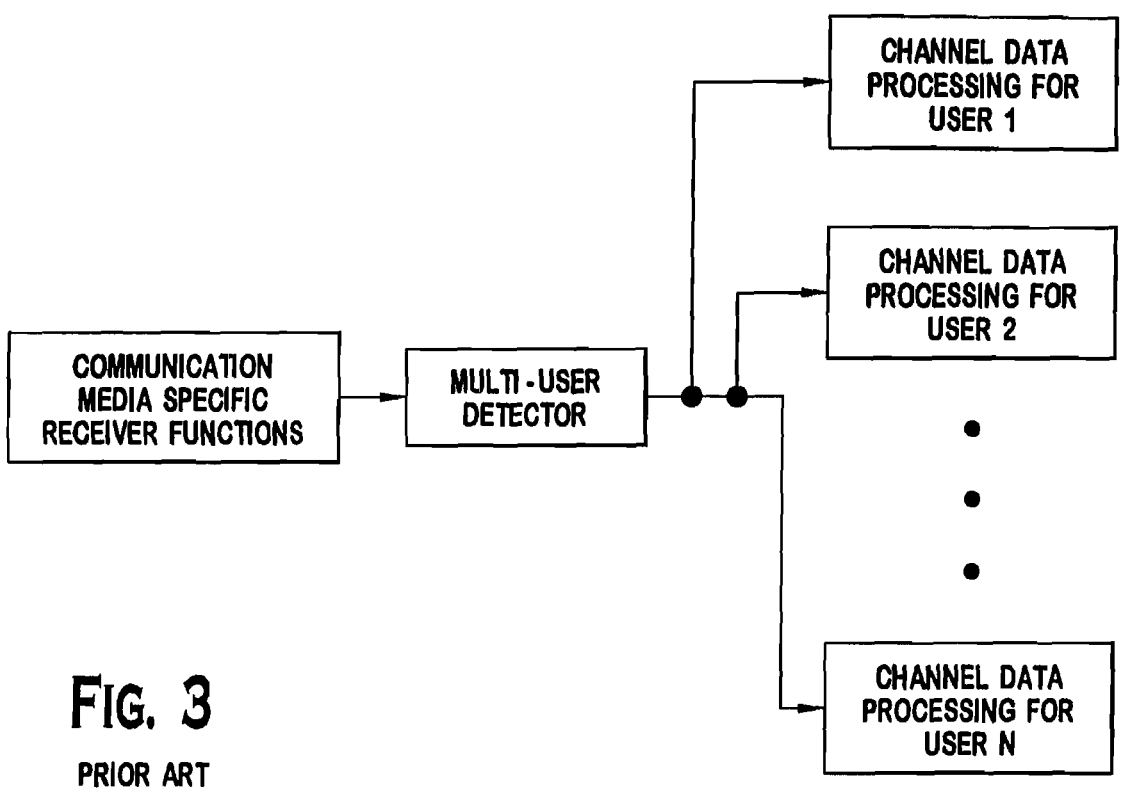
FIG. 3 is a simplified block diagram of a prior art CDMA receiver with multiuser detection.
Figure 4:
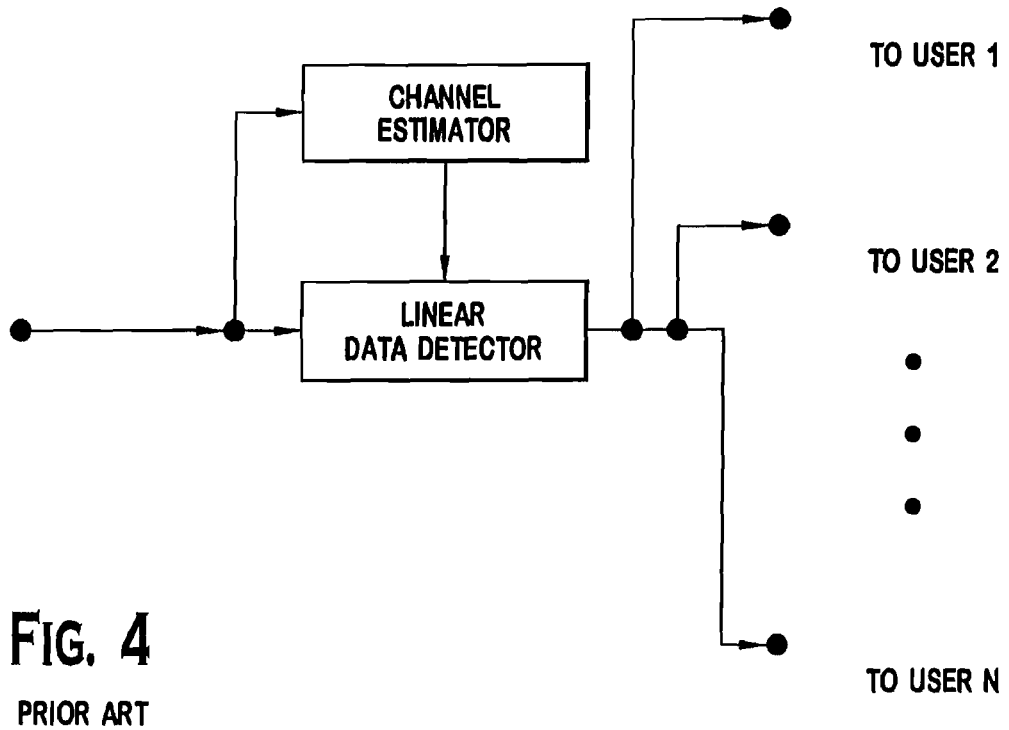
FIG. 4 is a simplified block diagram of a prior art multiuser detector.
Figure 5:
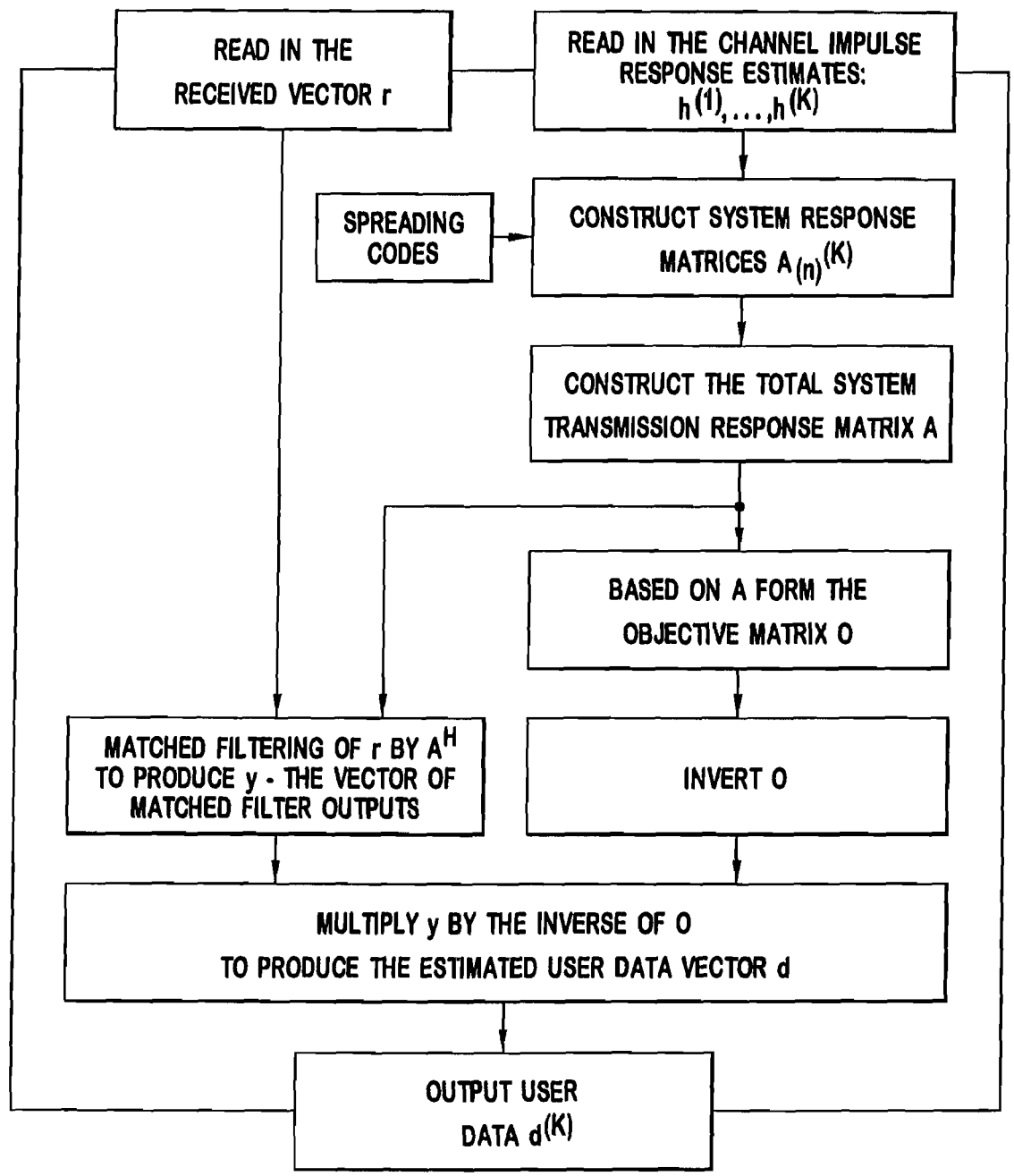
FIG. 5 is a block diagram of a prior art linear multiuser detector.
Figure 6:
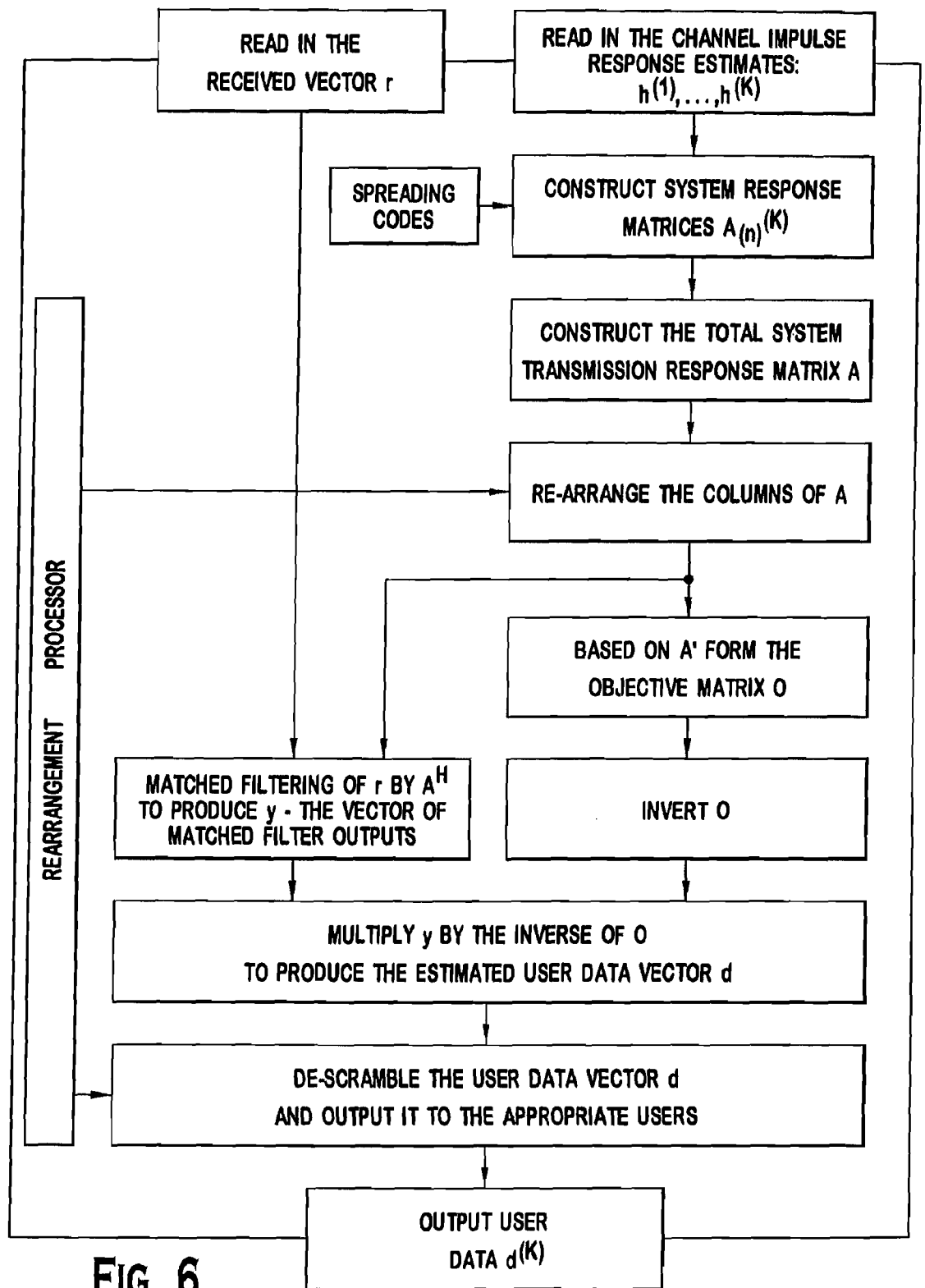
FIG. 6 is a block diagram of a prior art linear multiuser detector using Cholesky decomposition.

The embodiments will be described with reference to the drawing figures where like numerals represent like elements throughout.

Figure 7:
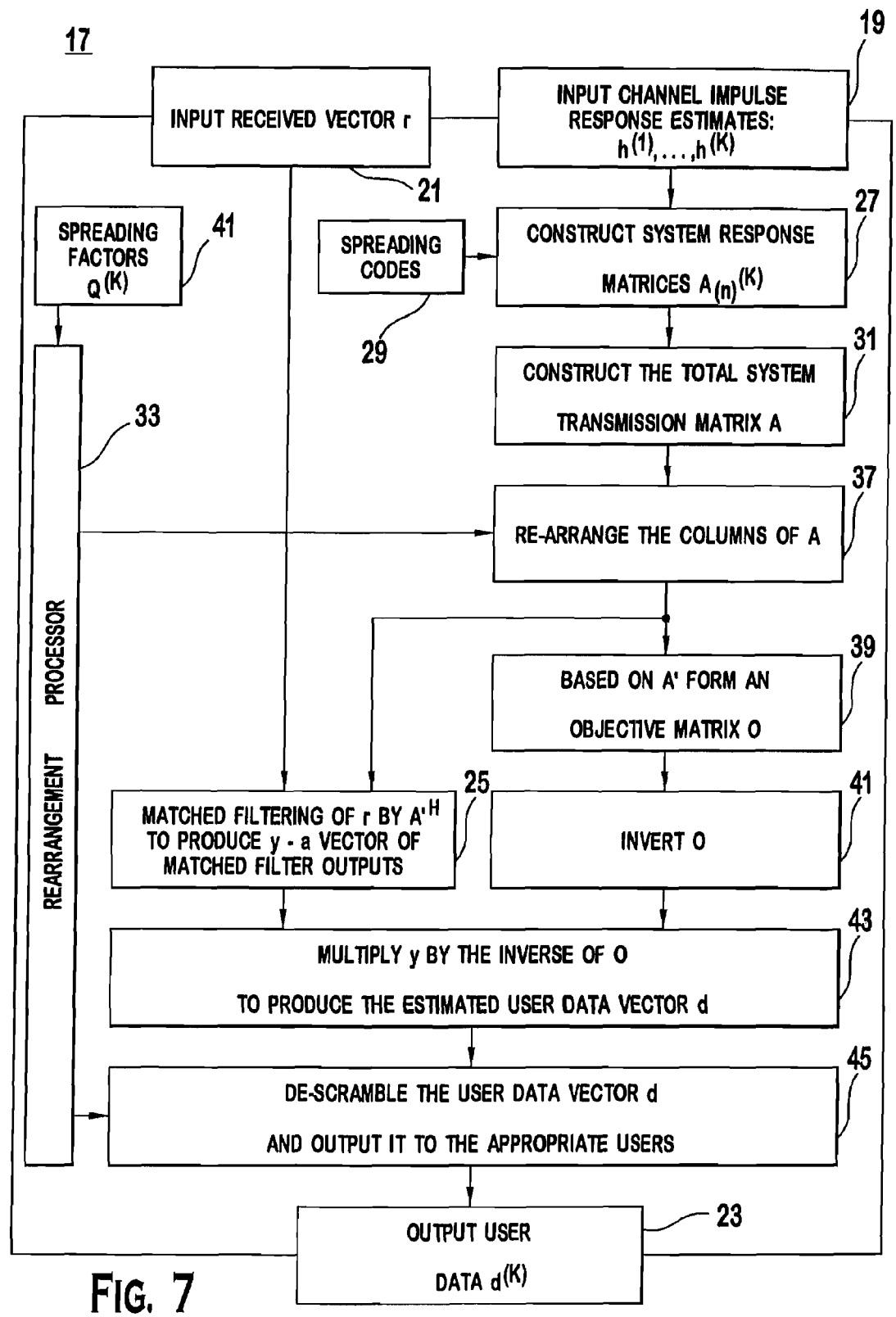
FIG. 7 is block diagram of a linear multiuser detector of the present invention.

Shown in FIG. 7 is a multiuser detector 17 for detecting, after reception, a plurality of users transmitting over a common CDMA channel. The multiuser detector 17 comprises a plurality of processors having collateral memory which perform various vector and matrix operations. Alternate embodiments include fixed gate arrays and DSPs performing the functions of the various processors. The detector 17 also comprises a first input 19 for inputting individual k subchannel impulse response estimates modeled as vectors $h^{(k)}$ to correct intersymbol interference or ISI caused by a subchannel's own symbols and multiple access interference or MAI caused by symbols from other user's subchannels for all received data signals, a second input 21 for inputting data from all users k transmitted in a discreet block of time in the form of an input vector r containing the combined data from each user's subchannel and an output 23 for outputting user data $d^{(k)}$ for each user k from the received channel data r in the form of an output vector. The total number of users K and the spreading factor $Q_{(k)}$ 41 for each user (k=1, 2, 3 . . . K) are known a priori.

To obtain user data $d^{(k)}$ for a specific user from the combined user data r, the user data must be filtered using a matched filter 25 or the like. One knowledgeable in this art recognizes that a matched filter 25 requires a response characteristic which is the complex conjugate of the combination of the spread pulse shape and the user's subchannel impulse response to produce an output with a level representative of the signal prior to transmission. Signals input to the filter 25 which do not match with a given response characteristic produce a lower output.

Each individual k subchannel impulse response estimate $h^{(k)}$ is input to a first memory 27 where it is combined with the same user's spreading code 29 (Equation 3) creating a system transmission response estimate matrix $A^{(k)}$ for that user. An arrangement processor 33 of the multiuser detector 17 performs a re-ordering of all matrix $A_n^{(k)}$ columns. The arrangement method requires that each subchannel system transmission response matrix $A^{(k)}$ have the column structure defined by Equation 4 which is typical of linear receivers. If the system transmission response matrices $A^{(k)}$ are not of the form defined by Equation 4, the arrangement processor 33 first re-arranges the columns to the structure defined by Equation 4. The multiuser detector 17 does not require that all system transmission response matrices $A^{(k)}$ be concatenated into a total system transmission response matrix A as defined by Equation 7.

Figure 8:
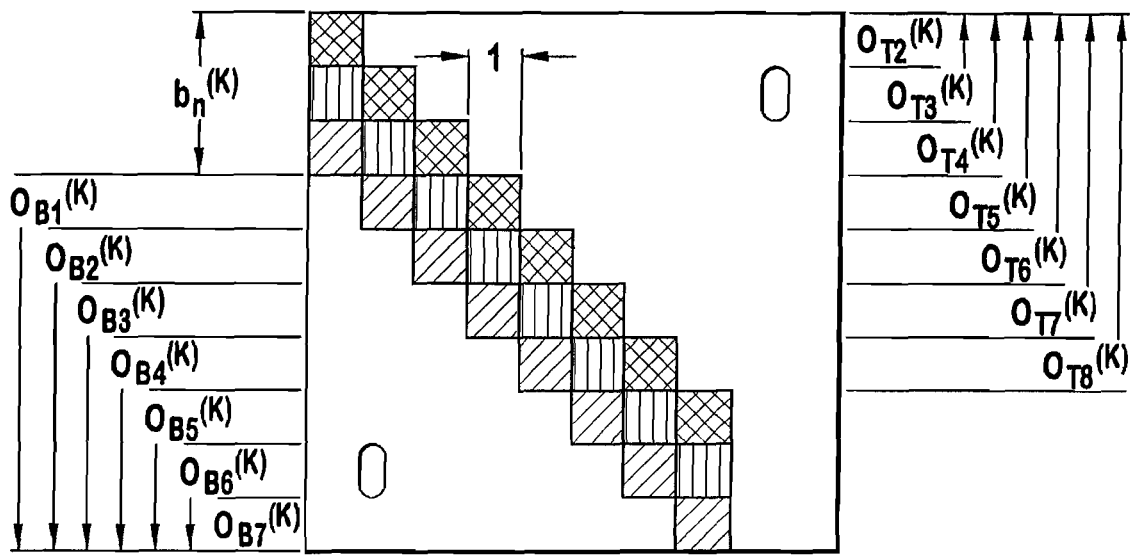
FIG. 8 depicts system transmission response matrix $A^{(k)}$ top and bottom column offsets.
Figure 9:
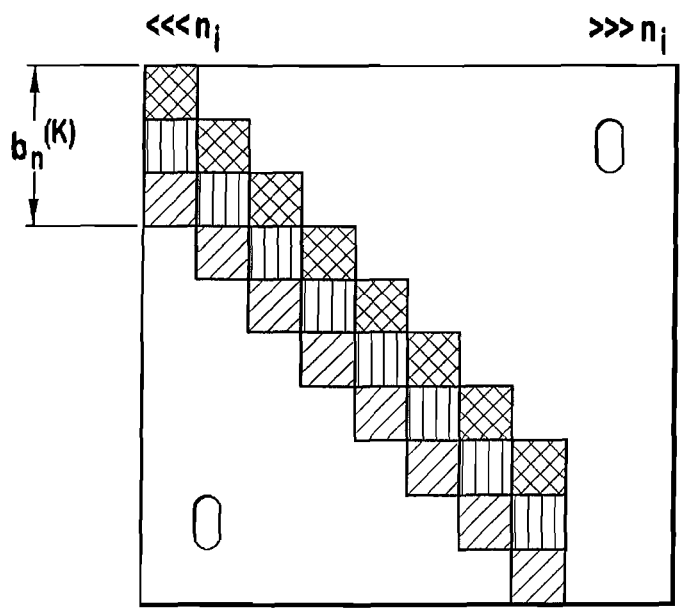
FIG. 9 depicts matrix column index value assignment.

The arrangement processor 33 examines each system transmission response matrix $A^{(1)}, A^{(2)}, A^{(3)}, \ldots A^{(k)}$ column for the number of zero-value elements from the support of each vector $b_n^{(k)}$ (Equation 4) defining top $o^{(k)}_{Tn}$ and bottom offsets $o^{(k)}_{Bn}$ as shown in FIG. 8 (for one matrix). As previously described, each system transmission response matrix $A^{(k)}$ has the same number of rows; only the number of columns vary. As shown in FIG. 9, the arrangement processor 33 assigns an index value $n_i$ for each column of each system transmission response matrices $A^{(k)}$ based upon their respective top $o^{(k)}_{Tn}$ and bottom $o^{(k)}_{Bn}$ offsets. The column values are assigned in the order of increasing magnitude from columns having minimal top offset with maximum bottom offset to columns having maximum top offset with minimal bottom offset.

If two columns are encountered where one has a greater top offset and a greater bottom offset than another, if the difference between top offsets is greater than the difference between bottom offsets, the column with the lower top offset is assigned the lower index $n_i$. If the difference between bottom offsets is greater than the difference between top offsets, the column with the greater bottom offset is assigned the lower index $n_i$. If the differences between top and bottom offsets are equal, either of the two columns can be assigned the lower index $n_i$.

The arrangement processor 33 assembles a total system transmission response matrix AN in the order of the assigned column indices $n_i$. The column indices $n_i$ are retained in memory 33 for use during the descrambling process 45. As an example, using the total system response matrices $A^{(1)}$ and $A^{(2)}$ described and shown in Equation 8, the arrangement method of the present invention 17 produces the total system transmission response matrix A shown below $$A' = \begin{bmatrix} b^{(1)}_{1,1} & b^{(2)}_{1,1} & 0 & 0 & 0 & 0 & 0 & 0 & 0 & 0 & 0 & 0 \\ b^{(1)}_{1,2} & b^{(2)}_{1,2} & 0 & 0 & 0 & 0 & 0 & 0 & 0 & 0 & 0 & 0 \\ b^{(1)}_{1,3} & b^{(2)}_{1,3} & b^{(1)}_{2,1} & 0 & 0 & 0 & 0 & 0 & 0 & 0 & 0 & 0 \\ b^{(1)}_{1,4} & b^{(2)}_{1,4} & b^{(1)}_{2,2} & 0 & 0 & 0 & 0 & 0 & 0 & 0 & 0 & 0 \\ b^{(1)}_{1,5} & b^{(2)}_{1,5} & b^{(1)}_{2,3} & b^{(1)}_{3,1} & b^{(2)}_{2,1} & 0 & 0 & 0 & 0 & 0 & 0 & 0 \\ 0 & b^{(2)}_{1,6} & b^{(1)}_{2,4} & b^{(1)}_{3,2} & b^{(2)}_{2,2} & 0 & 0 & 0 & 0 & 0 & 0 & 0 \\ 0 & b^{(2)}_{1,7} & b^{(1)}_{2,5} & b^{(1)}_{3,3} & b^{(2)}_{2,3} & b^{(1)}_{4,1} & 0 & 0 & 0 & 0 & 0 & 0 \\ 0 & 0 & 0 & b^{(1)}_{3,4} & b^{(2)}_{2,4} & b^{(1)}_{4,2} & 0 & 0 & 0 & 0 & 0 & 0 \\ 0 & 0 & 0 & b^{(1)}_{3,5} & b^{(2)}_{2,5} & b^{(1)}_{4,3} & b^{(1)}_{5,1} & b^{(2)}_{3,1} & 0 & 0 & 0 & 0 \\ 0 & 0 & 0 & 0 & b^{(2)}_{2,6} & b^{(1)}_{4,4} & b^{(1)}_{5,2} & b^{(2)}_{3,2} & 0 & 0 & 0 & 0 \\ 0 & 0 & 0 & 0 & b^{(2)}_{2,7} & b^{(1)}_{4,5} & b^{(1)}_{5,3} & b^{(2)}_{3,3} & b^{(1)}_{6,1} & 0 & 0 & 0 \\ 0 & 0 & 0 & 0 & 0 & 0 & b^{(1)}_{5,4} & b^{(2)}_{3,4} & b^{(1)}_{6,2} & 0 & 0 & 0 \\ 0 & 0 & 0 & 0 & 0 & 0 & b^{(1)}_{5,5} & b^{(2)}_{3,5} & b^{(1)}_{6,3} & b^{(1)}_{7,1} & b^{(2)}_{4,1} & 0 \\ 0 & 0 & 0 & 0 & 0 & 0 & 0 & b^{(2)}_{3,6} & b^{(1)}_{6,4} & b^{(1)}_{7,2} & b^{(2)}_{4,2} & 0 \\ 0 & 0 & 0 & 0 & 0 & 0 & 0 & b^{(2)}_{3,7} & b^{(1)}_{6,5} & b^{(1)}_{7,3} & b^{(2)}_{4,3} & b^{(1)}_{8,1} \\ 0 & 0 & 0 & 0 & 0 & 0 & 0 & 0 & 0 & b^{(1)}_{7,4} & b^{(2)}_{4,4} & b^{(1)}_{8,2} \\ 0 & 0 & 0 & 0 & 0 & 0 & 0 & 0 & 0 & b^{(1)}_{7,5} & b^{(2)}_{4,5} & b^{(1)}_{8,3} \\ 0 & 0 & 0 & 0 & 0 & 0 & 0 & 0 & 0 & 0 & b^{(2)}_{4,6} & b^{(1)}_{8,4} \\ 0 & 0 & 0 & 0 & 0 & 0 & 0 & 0 & 0 & 0 & b^{(2)}_{4,7} & b^{(1)}_{8,5} \end{bmatrix} \quad \text{Equation 12}$$

The arrangement method indexed the eight columns (1-8) of system transmission response matrix $A^{(1)}$ and the four columns (9-12) of system transmission response matrix $A^{(2)}$ in an order of 1, 9, 2, 3, 10, 4, 5, 11, 6, 7, 12, 8 to create a well-banded total system transmission response matrix A (Equation 12).

The arrangement method embodiment described above involves an examination of each system transmission response matrix $A^{(1)}$, $A^{(2)}$, $A^{(3)}$, ... $A^{(k)}$ comparing each column with every other column for top $o^{(k)}_{Tn}$ and bottom $o^{(k)}_{Bn}$ offsets. Given the special structure of each system transmission response matrix $A^{(k)}$, namely, that the columns of each matrix are arranged in order of increasing top offsets and decreasing bottom offsets as you progress from left to right (reference Equation 8, matrices $A^{(1)}$ and $A^{(2)}$), an alternative method 199 can be performed without having to examine each system transmission response matrix $A^{(k)}$ directly.

Figure 10A:
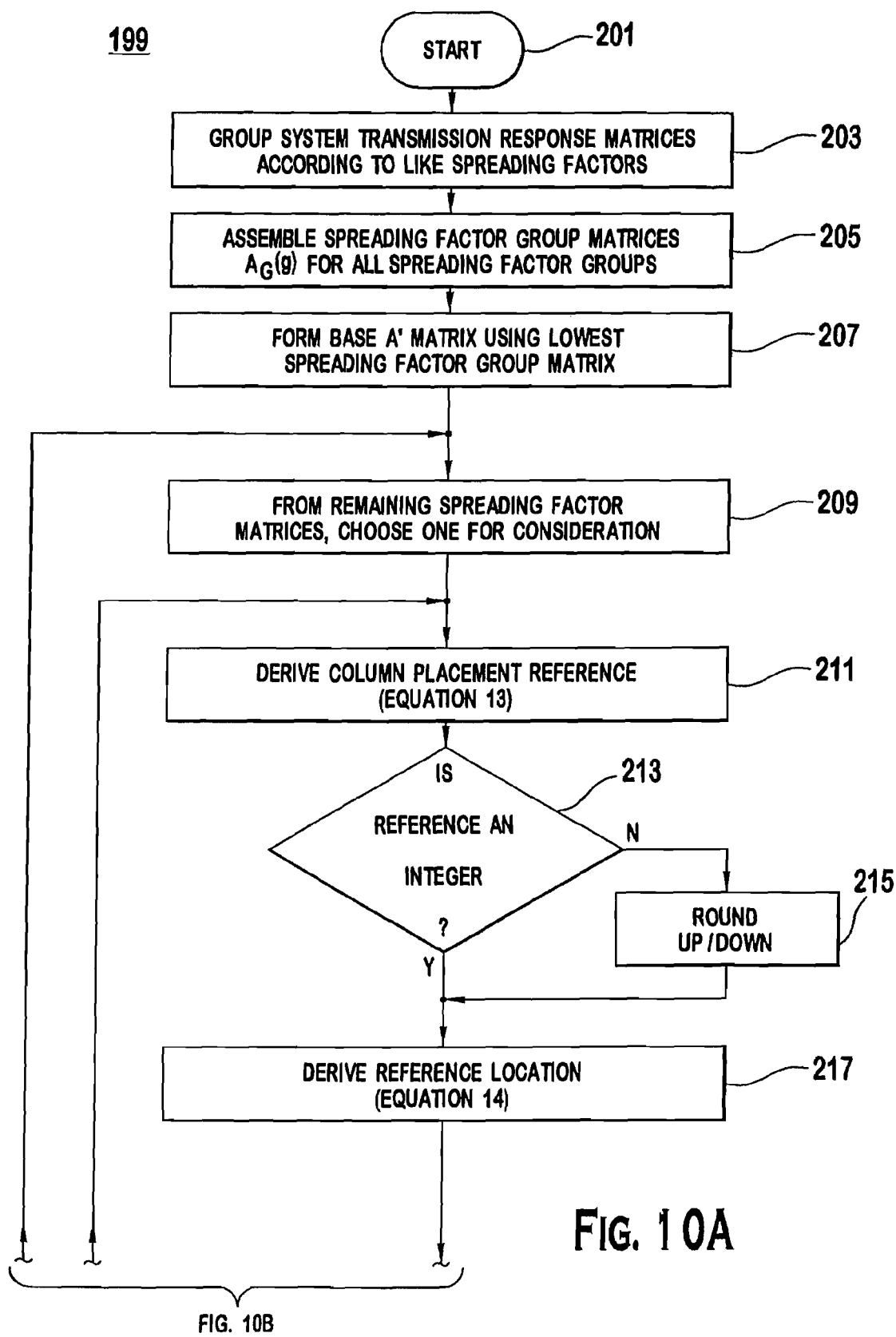
FIGS. 10A and 10B are flow diagrams of an alternative method implementing the present invention.
Figure 10B:
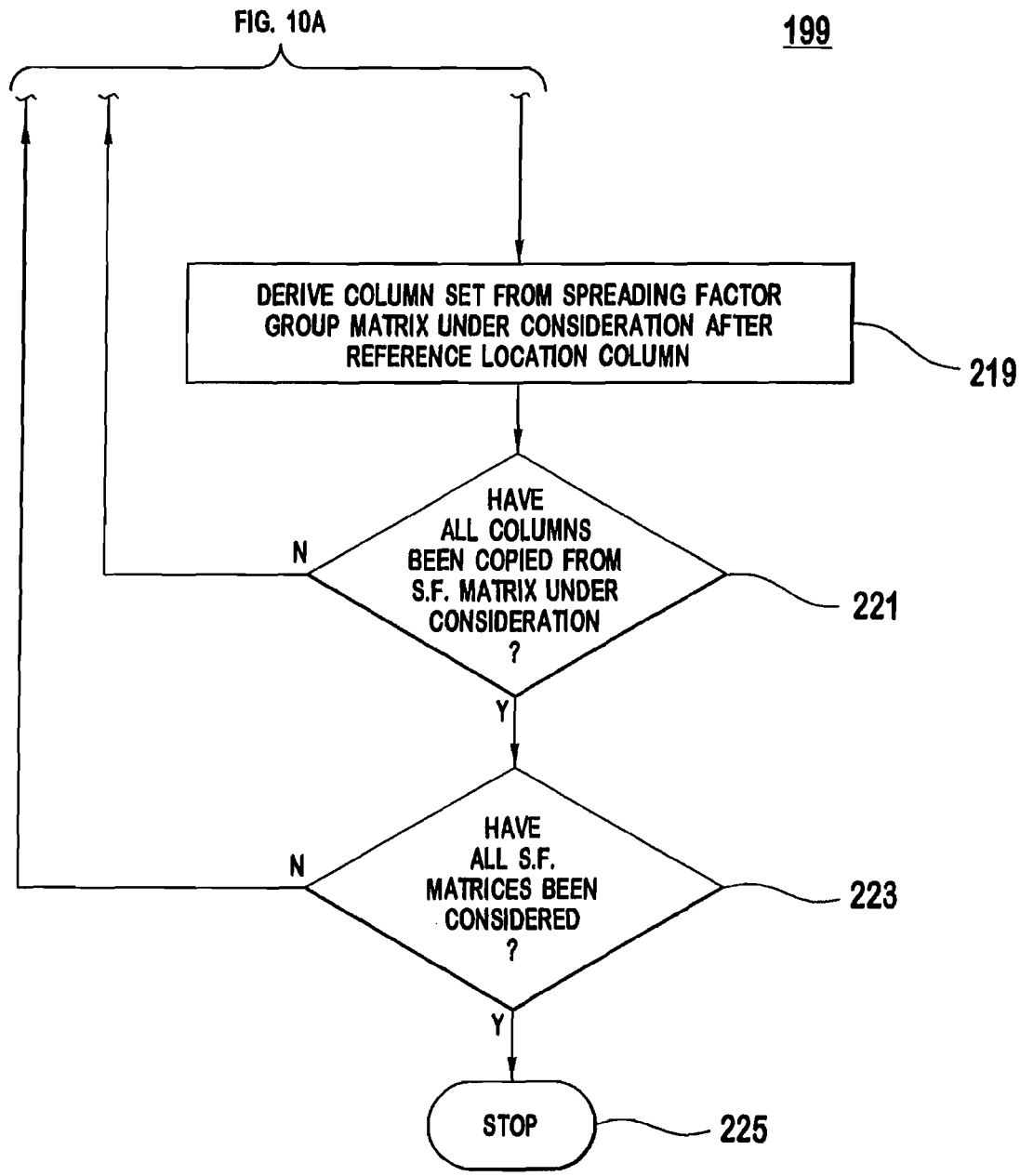

The alternative method 199 is shown in FIGS. 10A and 10B. All system transmission response matrices $A^{(k)}$ corresponding (step 201) to users having equal spreading factors are grouped together (step 203). For each spreading factor group g, memories are allocated within the processor 33 capable of storing all of the columns from all system transmission matrices $A^{(1)}$, $A^{(2)}$, $A^{(3)}$, ... $A^{(k)}$. The spreading factor groups g are arranged in order of increasing spreading factor.

An exemplary system illustrating the performance of the alternate method 199 contains seven users having four different spreading factors $Q^{(k)}$ assigned as follows:
User 1 $(Q^{(1)})$=8 User 2 $(Q^{(2)})$=8 User 3 $(Q^{(3)})$=8 User 4 $(Q^{(4)})$=32 User 5 $(Q^{(5)})$=16 User 6 $(Q^{(6)})$=16 User 7 $(Q^{(7)})$=4. Using the system and method 199 of the alternate method, the system transmission response matrices $A^{(k)}$ are separated into spreading factor groups:
group 1 (spreading factor 4) $A^{(7)}$
group 2 (spreading factor 8) $A^{(1)}$, $A^{(2)}$, $A^{(3)}$
group 3 (spreading factor 16) $A^{(5)}$, $A^{(6)}$
group 4 (spreading factor 32) $A^{(4)}$.

A respective spreading factor group g comprises at least one system transmission response matrix $A^{(k)}$, where each matrix $A^{(k)}$ is arbitrarily indexed from 1 to $L^{(g)}$. Each spreading factor group g is indexed according to increasing spreading factor magnitude.

Figure 11:
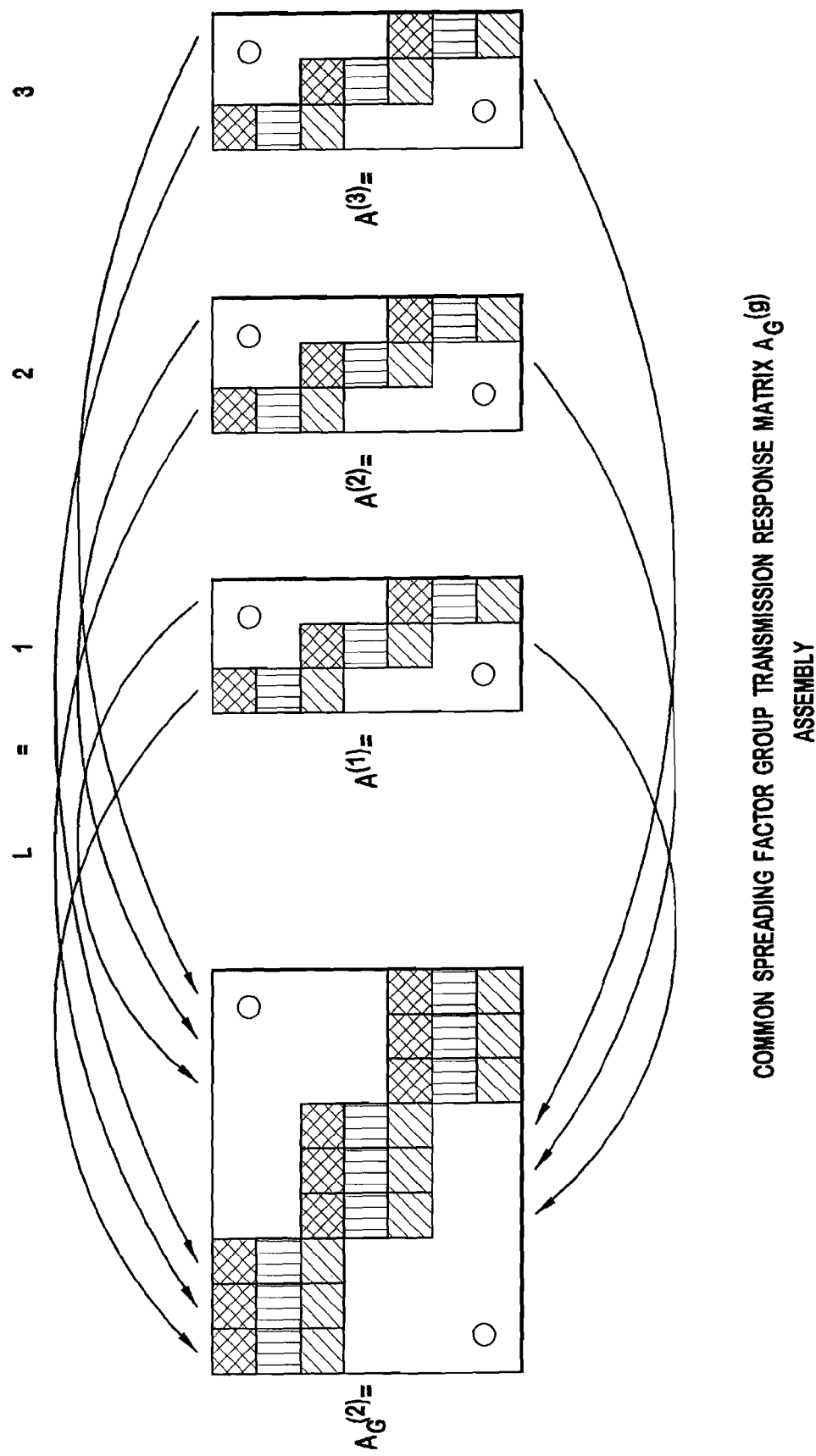
FIG. 11 depicts the steps for assembling a spreading factor group matrix $A_G^{(g)}$.

Within each spreading factor group, the columns of the associated system transmission response matrices $A^{(k)}$ are assembled into common spreading factor group transmission response matrices $A_G^{(g)}$, where g=1, 2, 3, ... G (step 205). As shown in FIG. 11, the method 199 copies the first column of the system transmission response matrix having index one to the first blank column of $A_G^{(g)}$; the first column of the system transmission response matrix having index two to the second blank column of $A_G^{(g)}$; continuing throughout the remaining system transmission response matrices in a respective spreading factor group g until all first columns are copied. The method 199 proceeds with copying the second columns, the third columns, etc., for each matrix $A^{(k)}$ in the respective spreading factor group $A_G^{(g)}$.

All matrices in a spreading factor group g have the same number of columns due to the same spreading factor. Therefore, the assembled spreading factor group transmission response matrices $A_G^{(g)}$ will have $L^{(g)}$ times the number of columns in one associated system transmission response matrices $A^{(k)}$.

To assemble a total system transmission response matrix AN accommodating variable spreading factors, the spreading factor group transmission response matrix $A_G^{(g)}$ having the lowest spreading factor is copied sequentially (step 207) into memory, beginning with the first column, i.e., column one of $A_G^{(g)}$, to the first allocated column of AN. The spreading factor group transmission response matrix $A_G^{(g)}$ having the lowest spreading factor has the maximum number of columns. All other spreading factor group transmission response matrix columns will be inserted into this base matrix AN.

If the system spreading factors are even integer multiples of each other (step 209), the processor 33 assembles the total system transmission matrix AN (step 211) by considering the remaining spreading factor group transmission matrices $A_G^{(g)}$ in any order (step 209). For each spreading factor group transmission matrix $A_G^{(g)}$, the processor 33 derives a column placement reference index m, $$m = n \cdot \frac{Q^{(g)}}{Q^{(1)}} - \frac{Q^{(g)}}{2 \cdot Q^{(1)}} \qquad \text{Equation 13}$$

where $Q^{(g)}$ denotes the spreading factor associated with the spreading factor group transmission matrix $A_G^{(g)}$ under consideration, $Q^{(1)}$ denotes the lowest spreading factor among all groups and n is the column of the spreading factor group transmission response matrix $A_G^{(g)}$ under consideration where n=1, 2, 3, ... N (step 211).

To use the column placement index m, a reference location in AN is derived (step 215) using the total number of system transmission response matrices $L^{(1)}$ that constitute the spreading factor group matrix having the lowest spreading factor, $$mHL^{(1)} \qquad \text{Equation 14}$$

The processor 33 derives a column set from the spreading factor group transmission response matrix $A_G^{(g)}$ under consideration (step 217) using the number of system transmission response matrices that belong to the spreading factor group currently under consideration, $$L^{(g)}H(n-1)+1 \text{ through } L^{(g)}Hn \qquad \text{Equation 15}$$

Figure 12:
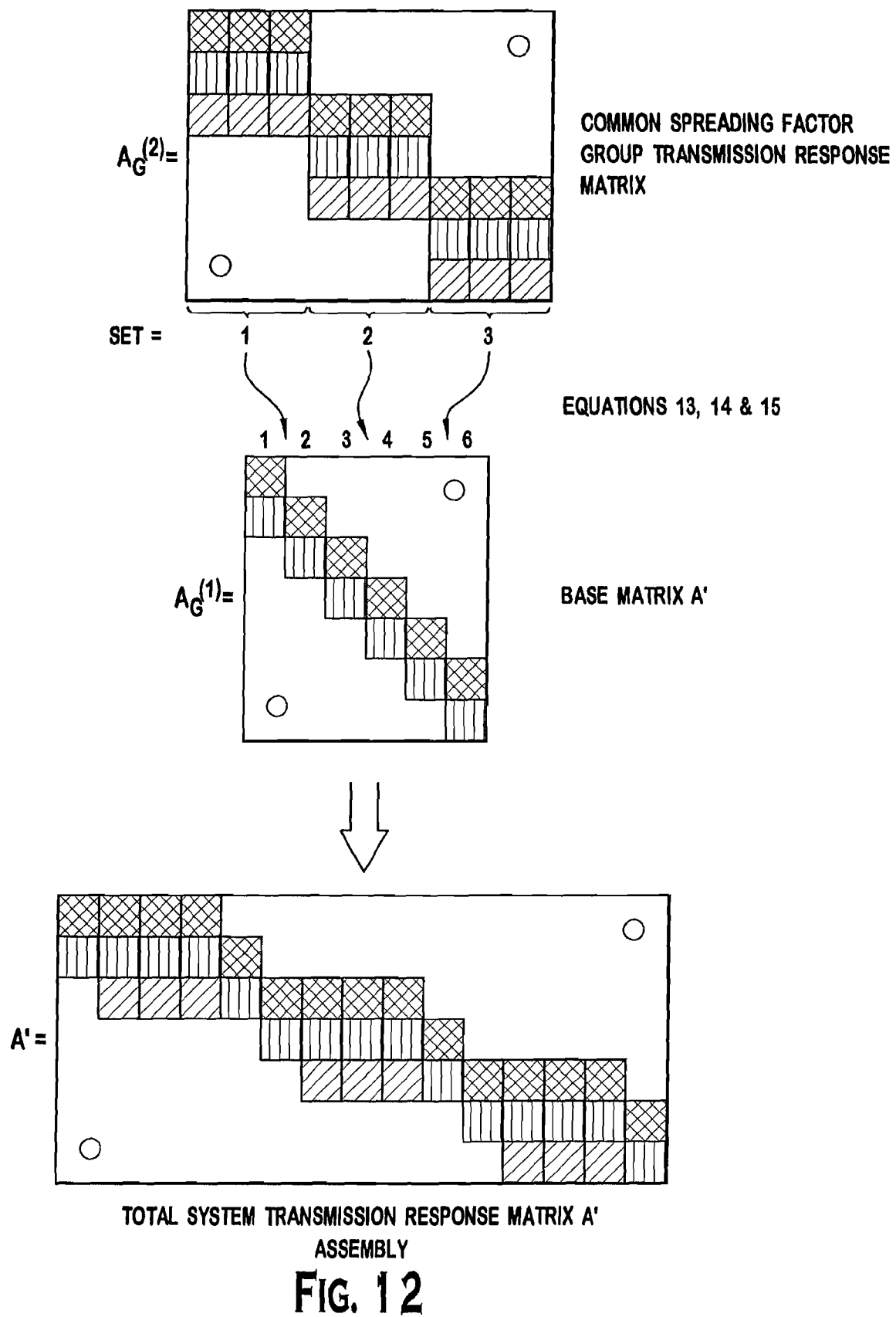
FIG. 12 depicts the steps for assembling an AN matrix in accordance with the present invention.

The processor 33 copies the column set defined by Equation 15 from $A_G^{(g)}$ and inserts it (step 219) into the base matrix AN after the column of $A_G^{(1)}$ which has the reference location defined by Equation 14 as shown in FIG. 12. The remaining columns of the spreading factor group matrix under consideration are copied and inserted into the base matrix AN similarly (step 221). After all columns from one spreading factor group matrix are placed, the processor 33 chooses the next spreading factor group matrix $A_G^{(g)}$ (step 223) and executes the above method. Equations 13, 14 and 15 allow the $i^{th}$ columns from the remaining spreading factor group transmission matrices $A_G^{(g)}$ to be placed in AN after an $m^{th}$ column that has similar support (step 225).

When the system spreading factors are not even integer multiples of each other, the right side expression of Equation 13 does not yield an integer. In this case, the processor 33 will round the result of Equation 13 to the nearest integer above or the nearest integer below the value (step 213). The rounding direction has negligible effect on overall system performance. The order in which the rest of the group system transmission matrices $A_G^{(g)}$ are considered may have some effect on the system performance. A priori knowledge of the spreading factors can be used to choose an optimum order in advance.

Using the arrangement techniques described above, and for the case when spreading factors are even integer multiples of each other, a matrix bandwidth B can be achieved which can be shown to be bounded as:

$$\left(\left\lceil \frac{W-1}{Q_{MAX}} \right\rceil \cdot \sum_{k=1}^{K} \frac{Q_{MAX}}{Q^{(k)}}\right) \leq$$

Equation 16

$$B \leq \left(\left(\left\lceil \frac{W-1}{Q_{MAX}} \right\rceil + 1\right) \cdot \sum_{k=1}^{K} \frac{Q_{MAX}}{Q^{(k)}}\right) - 1$$

Equation 16 predicts that the bandwidth of the total system transmission response matrix of Equation 11 will be between 3 and 6. An examination of Equation 12 reveals that the bandwidth after either arrangement method 199 is 4.

The improvement is further appreciated as the number of transmitted symbols increase. If a system transmitted 16,000 chips (800 symbols for a first user and 400 symbols for a second user), the bandwidth of the matrix $A^H A$ would be approximately 800. Using the arrangement method to produce a total system response matrix A, the bandwidth of $AN^H AN$ remains four since bandwidth (Equation 16) is independent of the number of transmitted symbols. After all of the elements of objective matrix O are derived, the inverse 41 is performed. Since the complexity of inverting a matrix is proportional to the square of its bandwidth, the present invention 17 provides a reduction of computational complexity by a factor of approximately $(800/4)^2 = 200^2 = 40,000$.

The total system transmission response matrix AN provides the response characteristics to the matched-filter 25. Each column of the system response matrix AN is a vector which represents the response characteristics of a particular symbol. The received data vector r is input to the matched-filter 25 where it is matched with every response characteristic from the total system transmission response matrix AN to produce a matched filter output vector y. Each element of output vector y corresponds to a preliminary estimate of a particular symbol transmitted by a given user. The output vector y from the matched-filter 25 is loaded into a multiplier 43 with the inverted objective matrix O. Both the matched-filter 25 output vector y and the inverted objective matrix O are multiplied yielding a user data vector d. The user data vector d contains all of the data transmitted from all users during the discreet time block. Since the objective matrix O and the matched filter 25 output are based on the total system response matrix AN, the user data vector d must be de-scrambled. The de-scrambling process is the inverse of the arrangement methods 199.

A descrambler 45 re-arranges each element of the user data vector d based upon the column re-assignments performed while undergoing either arrangement method 199. The elements of the data vector d are in the same order dictated by the total transmission response matrix A, 1, 9, 2, 3, 10, 4, 5, 11, 6, 7, 12, 8, transposed vertically. The descrambler 45 allocates a memory space having the same dimension and places each vector element in sequential order, 1-12. After the user data vector d is descrambled, the user data is output 23 for further processing.

Figure 13:
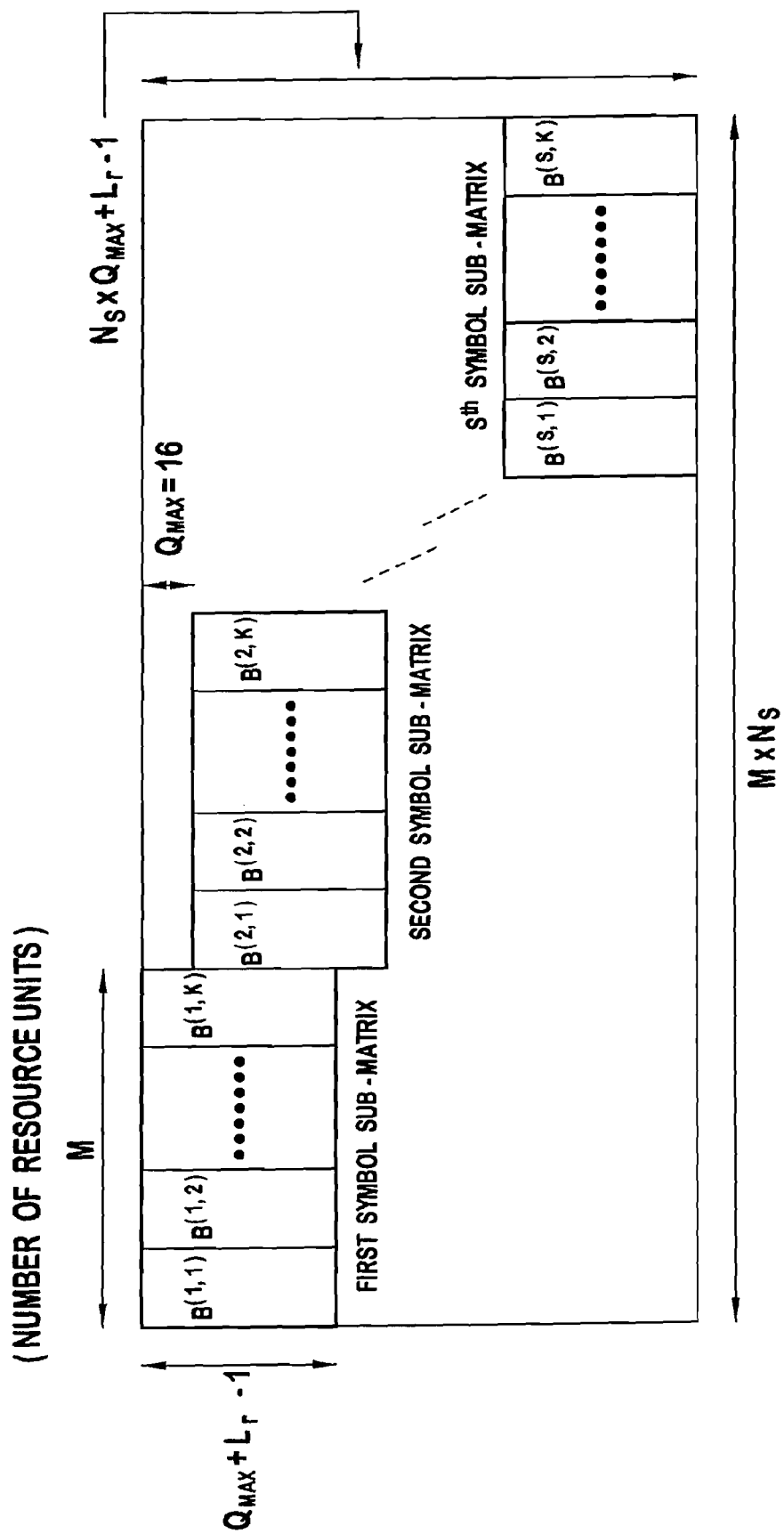
FIG. 13 depicts an alternate assembly for a system response matrix, A.
Figure 14:
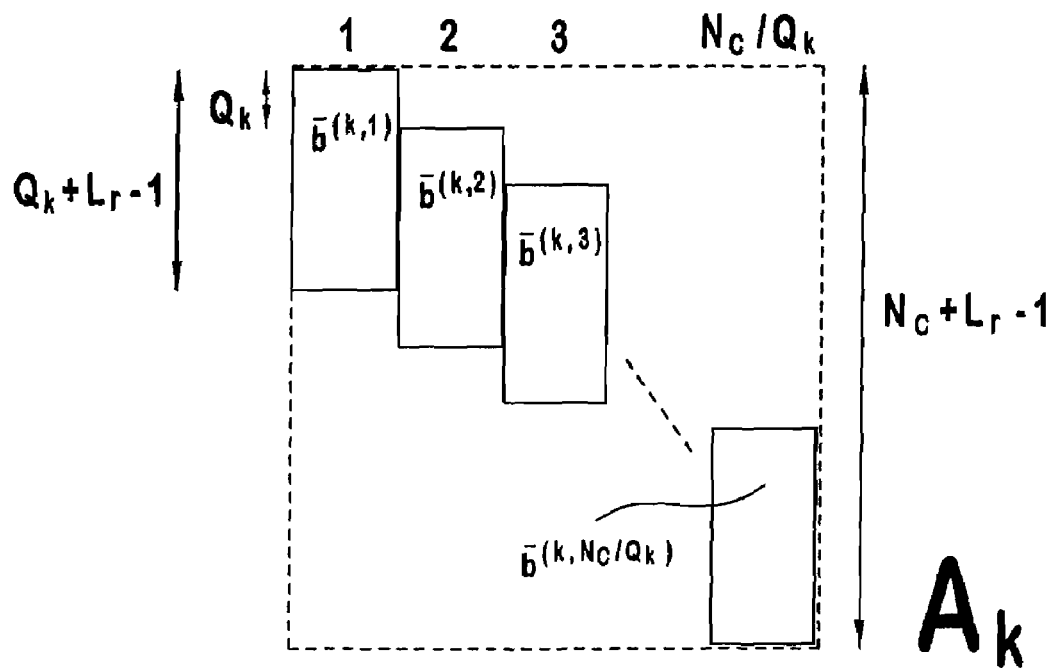
FIG. 14 depicts a system response matrix for a $k^{th}$ resource unit, $A_k$.
Figure 15:
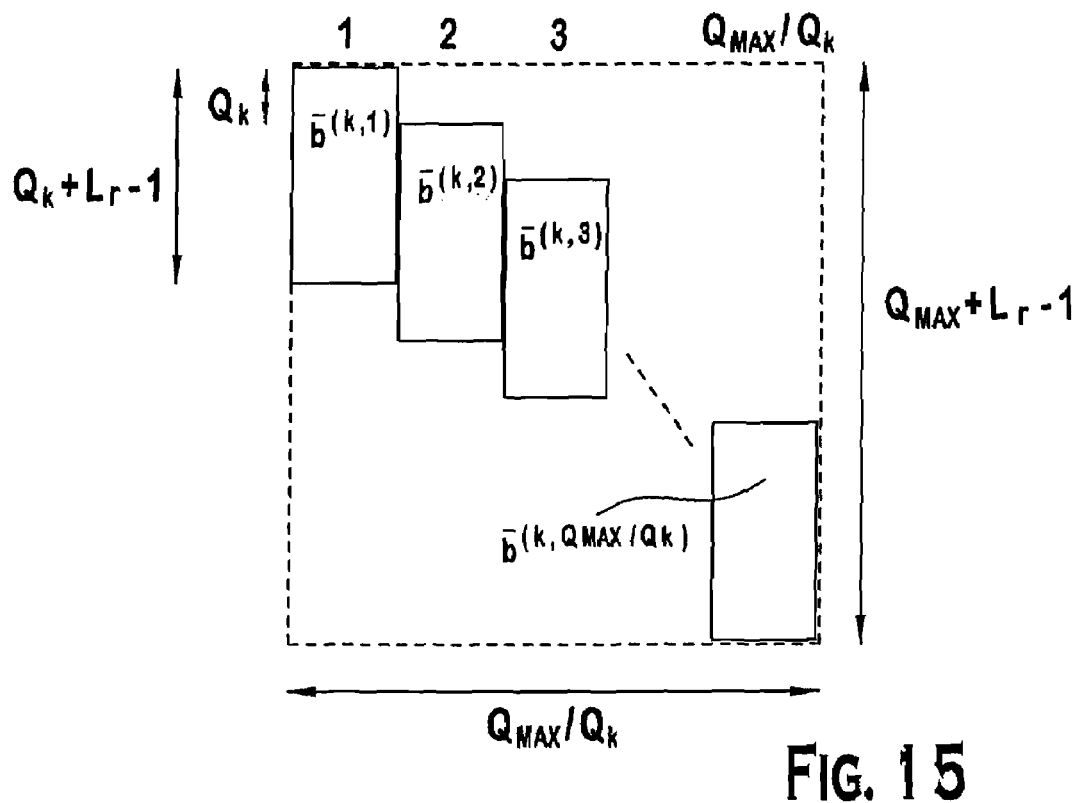
FIG. 15 depicts a first support block for a $k^{th}$ resource unit, $B^{(l,k)}$.
Figure 16:
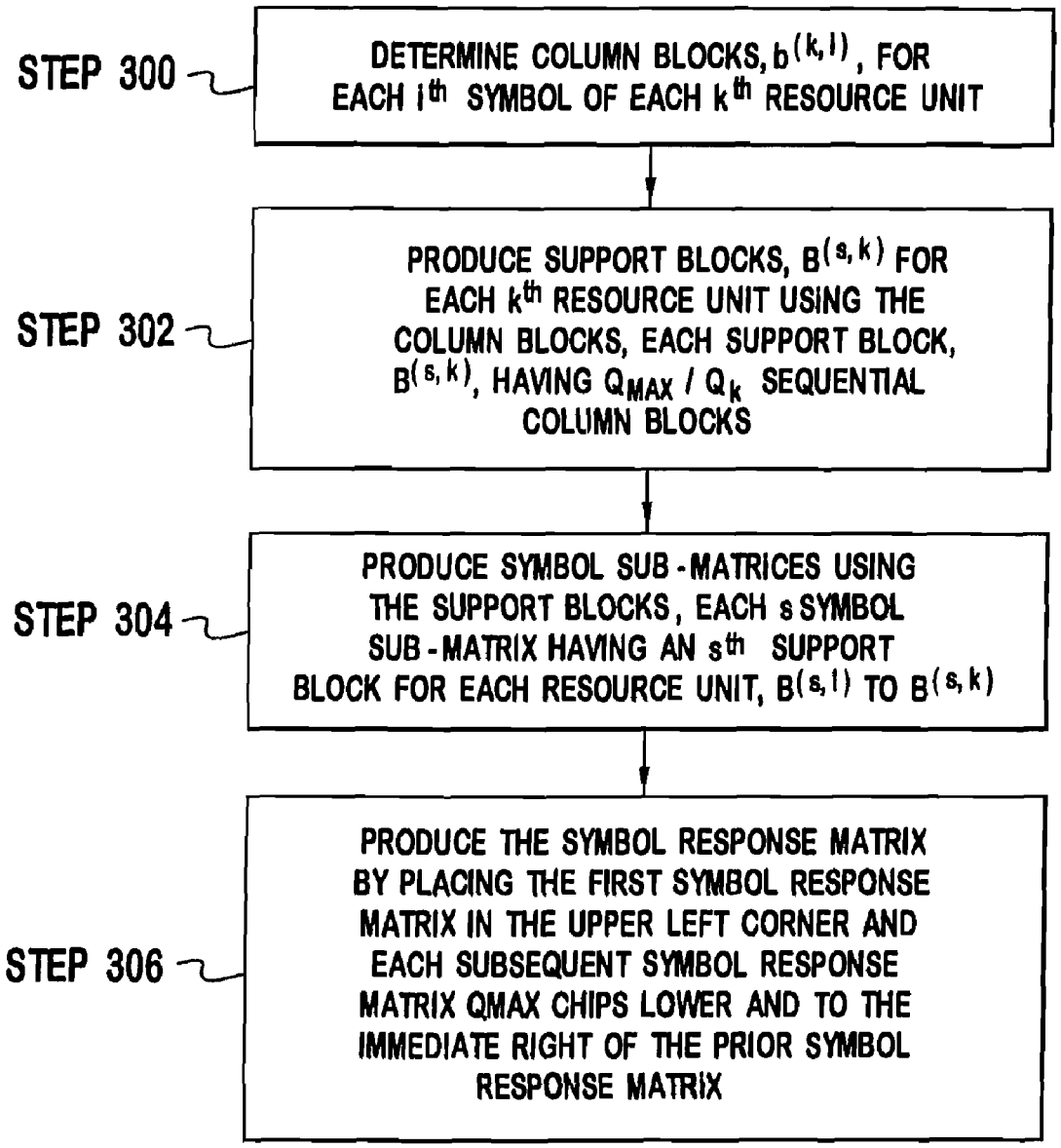
FIG. 16 depicts the steps for assembling the alternate system response matrix, A.

An alternate approach to reduce the bandwidth of a system transmission response matrix A is illustrated in FIGS. 13, 14 and 15 and is described with the flow chart of FIG. 16. FIG. 13 illustrates the symbol response matrix A. The A matrix is arranged so that there are S symbol sub-matrices. S is the minimum number of symbols that a data field of a resource unit in the system can have, $S = N_c/Q_{MAX}$. $N_c$ is the number of chips in the data field. $Q_{MAX}$ is the maximum spreading factor of the system, such as a spreading factor of 16. To illustrate for a time division duplex burst type 2, $N_c$ is 1104 and a typical maximum delay spread $Q_{MAX}$ is 16. As a result, the A matrix contains 69 ($N_c/Q_{MAX}$) sub-matrices.

Each sub-matrix has a support block $B^{(s,k)}$ for each of the K received resource units. The s represents the number of the symbol sub-matrix from 1 to S and k represents the number of the resource unit from 1 to K.

For each resource unit, a system response matrix can be constructed. FIG. 14 illustrates a system response matrix $A_k$ for a $k^{th}$ resource unit. The matrix has one column per data symbol of the resource unit, $N_c/Q_k$ columns. $Q_k$ is the $k^{th}$ resource unit's spreading factor. Each column has a column block $b^{(k,i)}$ for an $i^{th}$ column. Each block has a column length of that resource unit's symbol impulse response length $L_r$ plus one, $L_r+1$. For a first (left most) block $B^{(k,1)}$ of the matrix, the top of that block is at the top of the matrix. Each subsequent block is one symbol, $Q_k$, lower in the matrix. To illustrate, the column block of the second column $b^{(k,2)}$ is $Q_k$ chips lower in the matrix than $b^{(k,1)}$.

Each column block $b^{(k,i)}$ corresponds to an $i^{th}$ symbol of the $k^{th}$ resource unit. It is derived by a chip-by-chip multiplication of the $i^{th}$ segment of the scrambling code and the $k^{th}$ resource unit's code convolved with the channel impulse response of that segment as per Equation 17, step 300.

$$b^{(k,i)} = (c^{(k,i)} * cscram^{(k,i)}) \otimes h^{(k)}$$

Equation 17

$c^{(k,i)}$ is the $i^{th}$ segment of the $k^{th}$ code. $cscram^{(k,i)}$ is the $i^{th}$ segment of the scrambling code. $h^{(k)}$ is the channel response for the $k^{th}$ resource unit. As a result, the length of each column block for a $k^{th}$ resource unit is $Q_k + L_r - 1$.

The column blocks of the resource unit system response matrices $A_1$ to $A_K$ are used to produce support blocks for the symbol sub-matrices of FIG. 13. FIG. 15 illustrates a support block $B^{(k,1)}$ for a $k^{th}$ resource unit in the first symbol block. The support block $B^{(k,1)}$ has $Q_{MAX}/Q_k$ columns. To illustrate, if the maximum spreading factor of the system is 16 ($Q_{MAX}=16$) and the spreading factor for this resource unit is 1 ($Q_k=1$), the support block $B^{(k,1)}$ has 16 columns. By contrast, if the resource unit spreading factor is 16, the support block $B^{(k,1)}$ has 1 column.

For the first support block derived from a $k^{th}$ resource unit, the first $Q_{MAX}/Q_k$ column blocks of that resource unit's system response matrix $A_k$ are taken. The first column of the support block has the first block column of the system response matrix K. The top of the first block column in the support block is at the top of the support block. Each sequential column block is $Q_k$ chips lower in the support column. The resulting overall height of the support block is $Q_{MAX} + L_r - 1$, regardless of the spreading factor $Q_k$, step 302.

FIG. 13 shows the support blocks in the symbol sub-matrices, $B^{(s,k)}$. Each symbol sub-matrix, $B^{(s,k)}$, has an $s^{th}$ support block for each resource unit, step 304. Alternately, the column blocks $b^{(k,i)}$ can be taken from the $A_k$ matrix and inserted directly into the symbol sub-matrices, $B^{(s,k)}$. Each block column $b^{(k,i)}$ of the support block is taken from a block column of that resource unit's $A_k$ matrix. The columns taken from the matrix for a symbol sub-block s is $b^{(k,x+1)}$ to $b^{(k,x+QMAX/Qk)}$. x is per Equation 18.

$$x = (s-1) * Q_{MAX}/Q_k$$

Equation 18

For a particular resource unit k, each symbol sub-block contains $Q_{MAX}/Q_k$ of that resource unit's column blocks. The first column block in the support block has its top at the top of the support block. Each subsequent column is $Q_{MAX}/Q_k$ chips lower in the support block.

As shown in FIG. 13, each symbol sub-block has a support block $B^{(s,k)}$ for each resource unit. Although the resource units can be arranged in any order and still achieve a reduced bandwidth, by placing resource units transmitted with the lowest spreading factors at the exterior of each sub-matrix block, the bandwidth may be further reduced. To illustrate, a first column block has a spreading factor of 1 ($Q_1=1$). Accordingly, the length of the first column block of the first support of the first symbol sub-matrix is $L_r$. If the spreading factor is 16 ($Q_1=16$), the length of the first column block is $15+L_r$. These additional 15 chips increase the overall bandwidth. The same is true with the last column of the last support of the last sub-matrix. However, in some implementations, the potential reduction in bandwidth may not outweigh the added complexity for reordering the resource units.

A $s^{th}$ symbol sub-matrix has the s support blocks for each resource unit, step 304. Since each support has the same height, each sub-matrix has the same height of $Q_{MAX}+L_r-1$ chips. The width of each sub-matrix is M as per Equation 19.

$$M = \sum_{k=1}^{K} Q_{MAX}/Q_k \qquad \text{Equation 19}$$

The first symbol sub-matrix is in the upper left corner of the system response matrix A. Each subsequent matrix is along side the previous matrix and $Q_{MAX}$ chips further down, step 306. The overall height of the A matrix is $N_s*Q_{MAX}+L_r-1$ and the overall width is $M*N_s$. As shown in FIG. 13, this configuration of the A matrix reduces the bandwidth considerably. Furthermore, the complexity at deriving this reduced bandwidth A matrix is small.

In a practical communication station, due to over sampling and transmit or reception diversity, the A matrix may comprise several sub-matrices. The receiver at either the user equipment or at the base station may sample the received vector, r, at a multiple of the chip rate, such as at twice or four times the chip rate. Furthermore, transmit or reception diversity may be used. For a system using over sampling and transmit/reception diversity, the A matrix can be viewed as having a sub-matrix for each combination of samples from the over sampling and from the diversity. To illustrate, a receiver may sample at twice the chip rate producing even and odd samples. The receiver may also receive the signal over two spatially diverse antennas, antenna 1 and antenna 2. As a result, four combinations result: an even set over antenna 1, an odd set over antenna 1, an even set over antenna 2 and an odd set over antenna 2. In such a case, the received signal can be modeled per Equation 20

$$A = \begin{bmatrix} A_{1,o} \\ A_{1,e} \\ A_{2,o} \\ A_{2,e} \end{bmatrix} \qquad \text{Equation 20}$$

$A_{1,o}$ corresponds to antenna 1 and the even samples. $A_{1,e}$ corresponds to antenna 1 and the odd samples. $A_{2,o}$ corresponds to antenna 2 and the odd samples. $A_{2,e}$ corresponds to antenna 2 and the even samples.

In the general case, where m-multiple of the chip rate sampling is used and n antennas are used, A can be modeled per Equation 21.

$$A = \begin{bmatrix} A_{1,1} \\ \vdots \\ A_{1,n} \\ \vdots \\ A_{m,1} \\ \vdots \\ A_{m,n} \end{bmatrix} \qquad \text{Equation 21}$$

To reduce the bandwidth of the A matrix, each of the sub-matrices has its bandwidth reduced by one of the bandwidth reduction techniques. When the A matrix is used in a data detection scheme, the reduced bandwidth of each sub-matrix reduces the bandwidth of the A matrix.

While the present invention has been described in terms of the preferred embodiment, other variations which are within the scope of the invention as outlined in the claims below will be apparent to those skilled in the art.

What is claimed is:

1. A method for use in a wireless transmit/receive unit (WTRU) that includes a receiver and at least one processor, the method comprising:
   the receiver receiving a plurality of communication signals having differing spreading factors, each communication signal having an associated code and comprising symbols;
   the at least one processor generating a plurality of transmission response matrices;
   the at least one processor grouping the plurality of transmission response matrices according to spreading factors associated with each of the plurality of transmission response matrices;
   the at least one processor assembling a plurality of spreading factor group matrices;
   the at least one processor forming a base matrix based upon a spreading factor group matrix of the plurality of spreading factor group matrices having a lowest spreading factor;
   the at least one processor selecting an additional spreading factor group matrix of the plurality of spreading factor group matrices for consideration;
   the at least one processor deriving a column placement reference index for the base matrix;
   the at least one processor deriving a reference location for the base matrix;
   the at least one processor deriving a column set from the selected additional spreading factor group matrix;
   the at least one processor inserting the column set into the base matrix; and
   the at least one processor assembling a total transmission response matrix.

2. The method of claim 1 wherein generating a plurality of transmission response matrices comprises:
   for each symbol of each communication, producing a column block of that symbol convolved with an impulse response;
   for each communication, producing support blocks comprising a number of the column block of that communication based on a spreading factor for each communication;
   producing symbol sub-matrices, each symbol sub-matrix comprising a support block for each communication; and
   assembling the symbol sub-matrices into the transmission response matrices.

3. The method of claim 1, further comprising detecting data included in the communications using the total transmission response matrix.

4. The method of claim 1 wherein the column placement reference index is derived using a total number of transmission response matrices that constitute the spreading factor group having the lowest spreading factor.

5. The method of claim 1, further comprising:
deriving additional column sets for the base matrix from the selected spreading factor group matrix; and
inserting the additional column sets into the base matrix.

6. A wireless transmit/receive unit (WTRU) comprising:
a receiver configured to receive a plurality of communication signals having differing spreading factors, each communication signal having an associated code and comprising symbols; and
at least one processor configured to:
generate a plurality of transmission response matrices;
group the plurality of transmission response matrices according to spreading factors associated with each of the plurality of transmission response matrices;
assemble a plurality of spreading factor group matrices;
form a base matrix based upon a spreading factor group matrix of the plurality of spreading factor group matrices having a lowest spreading factor;
select an additional spreading factor group matrix of the plurality of spreading factor group matrices for consideration;
derive a column placement reference index for the base matrix;
derive a reference location for the base matrix;
derive a column set from the selected additional spreading factor group matrix;
insert the column set into the base matrix; and
assemble a total transmission response matrix.

7. The WTRU of claim 6 wherein the processor is configured to generate the plurality of transmission response matrices by being further configured to:
for each symbol of each communication, produce a column block of that symbol convolved with an impulse response;
for each communication, produce support blocks comprising a number of the column block of that communication based on a spreading factor for each communication;
produce symbol sub-matrices, each symbol sub-matrix comprising a support block for each communication; and
assemble the symbol sub-matrices into the transmission response matrices.

8. The WTRU of claim 6, wherein the WTRU further comprises a receiver configured to:
detect data included in the communications using the total transmission response matrix.

9. The WTRU of claim 6, wherein the processor is further configured to derive the column placement reference index using a total number of transmission response matrices that constitute the spreading factor group having the lowest spreading factor.

10. The WTRU of claim 6, wherein the processor is further configured to:
derive additional column sets for the base matrix from the selected spreading factor group matrix; and
insert the additional column sets into the base matrix.

* * * * *